US008186742B2

(12) United States Patent
Narayana et al.

(10) Patent No.: US 8,186,742 B2
(45) Date of Patent: *May 29, 2012

(54) VEHICLE SLIDING DOOR STRUCTURE

(75) Inventors: Naga A. Narayana, Farmington Hills, MI (US); Erik Anderson, Plymouth, MI (US); Micah P. Woolace, Commerce Township, MI (US); Tadashi Masuda, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 275 days.

This patent is subject to a terminal disclaimer.

(21) Appl. No.: 12/610,923

(22) Filed: Nov. 2, 2009

(65) Prior Publication Data

US 2011/0099913 A1 May 5, 2011

(51) Int. Cl.
*B60J 5/06* (2006.01)

(52) U.S. Cl. .................. 296/146.6; 296/155; 49/503

(58) Field of Classification Search .......... 49/502, 49/503; 292/337; 296/146.1, 146.2, 146.6, 296/146.5, 146.9, 187.12, 155
See application file for complete search history.

(56) References Cited

U.S. PATENT DOCUMENTS

| | | | | |
|---|---|---|---|---|
| 5,364,157 | A * | 11/1994 | Siedlecki | 296/146.6 |
| 5,735,558 | A | 4/1998 | Watanabe | |
| 6,692,057 | B2 | 2/2004 | Igarashi et al. | |
| 6,779,829 | B2 * | 8/2004 | Chappuis et al. | 296/146.5 |
| 7,390,054 | B2 * | 6/2008 | Suzuki | 296/187.12 |

FOREIGN PATENT DOCUMENTS

JP 2005-335412 A 12/2005

OTHER PUBLICATIONS

U.S. Department of Transportation, National Highway Traffic Safety Administration Laboratory Test Procedure for FMVSS No. 206, Door Locks and Door Retention Components, Mar. 16, 1998, 47 pages, TP-206-06, Washington D.C.
U.S. Department of Transportation, National Highway Traffic Safety Administration 49 CFR Part 571, Federal Motor Vehicle Safety Standards; Door Locks and Door Retention Components and Side Impact Protection, 24 pages, Washington D.C.

* cited by examiner

*Primary Examiner* — Dennis Pedder
*Assistant Examiner* — Jason S Daniels
(74) *Attorney, Agent, or Firm* — Global IP Counselors, LLP

(57) ABSTRACT

A vehicle sliding door structure includes an inner door panel, an outer door panel, a reinforcing bracket and a first bulkhead. The inner door panel has a vertically oriented sash section extending along an outboard facing surface thereof adjacent to a rearward side of an outer peripheral edge thereof. The sash section has a latch mechanism supporting part proximate a mid-region of the rearward side of the outer peripheral edge. The outer door panel is fixed to the outer peripheral edge of the inner door panel. The reinforcing bracket is fixedly attached to the outboard facing surface of the inner door panel along a region of the sash section that extends from below the latch mechanism supporting part to above the latch mechanism supporting part. The first bulkhead is fixedly attached to the reinforcing bracket and extends from the reinforcing bracket toward the outer door panel.

25 Claims, 24 Drawing Sheets

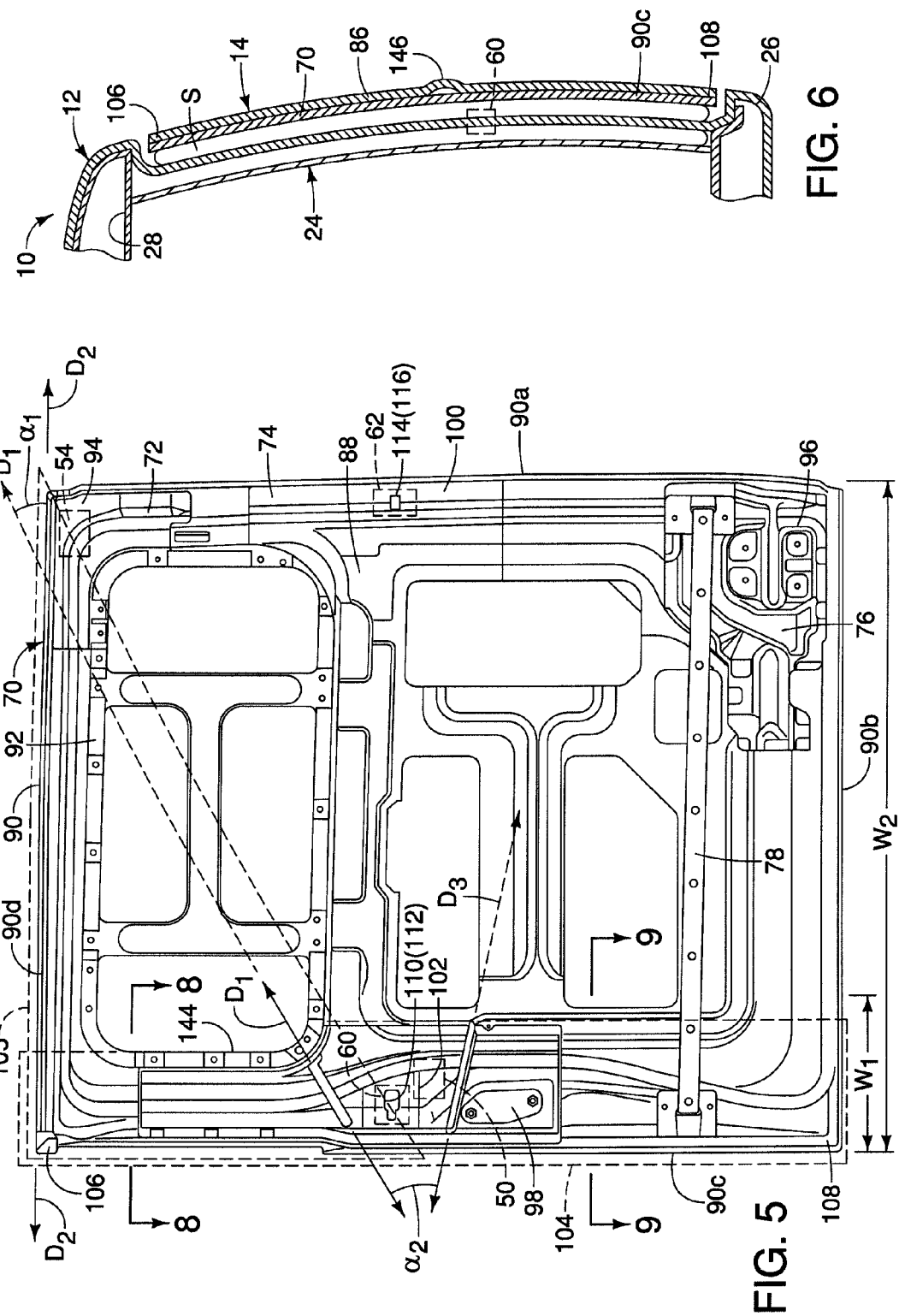

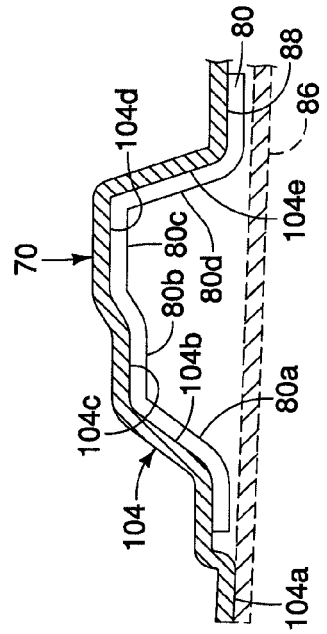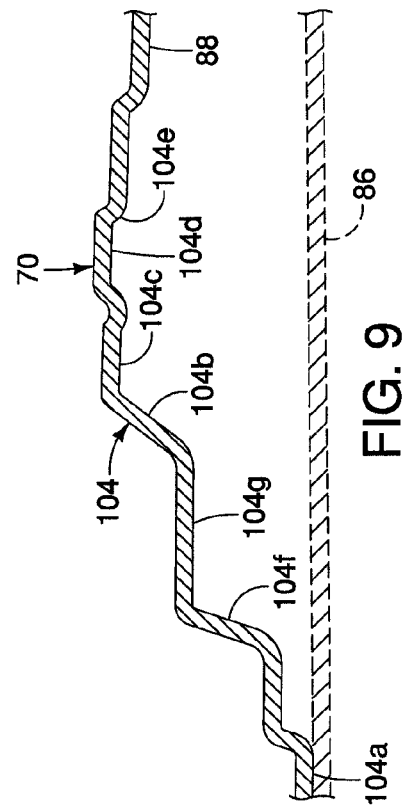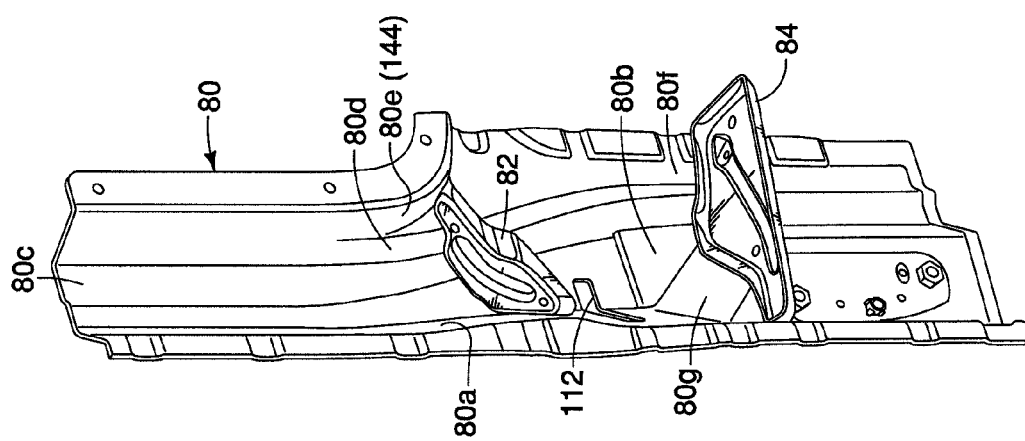

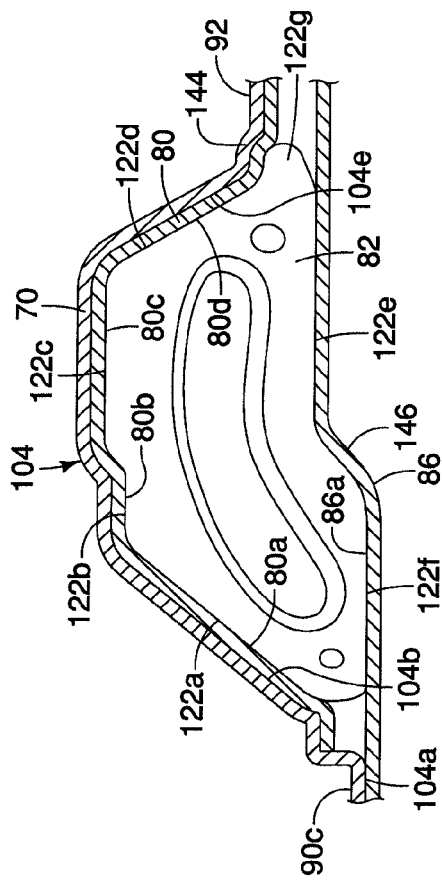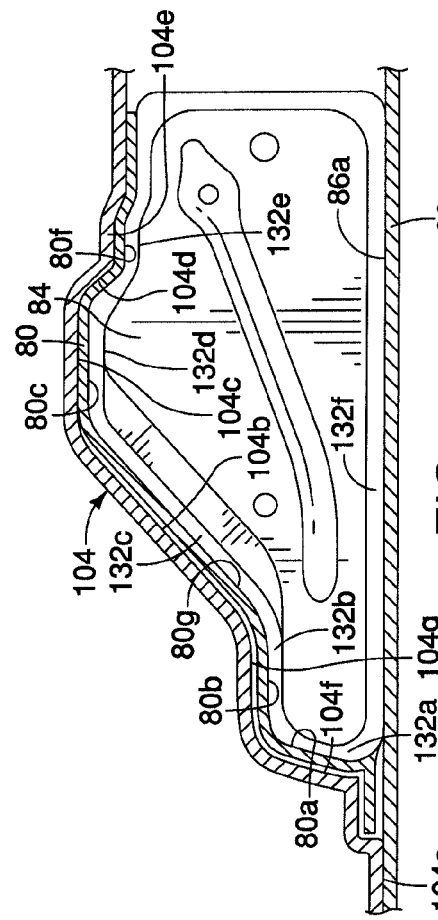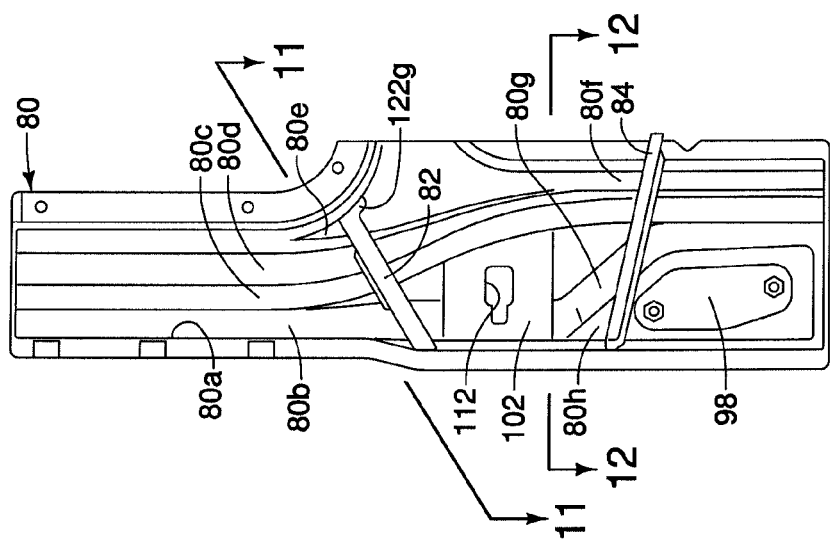

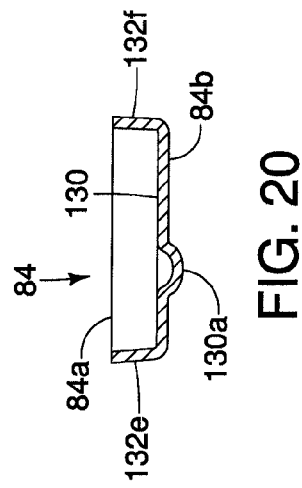
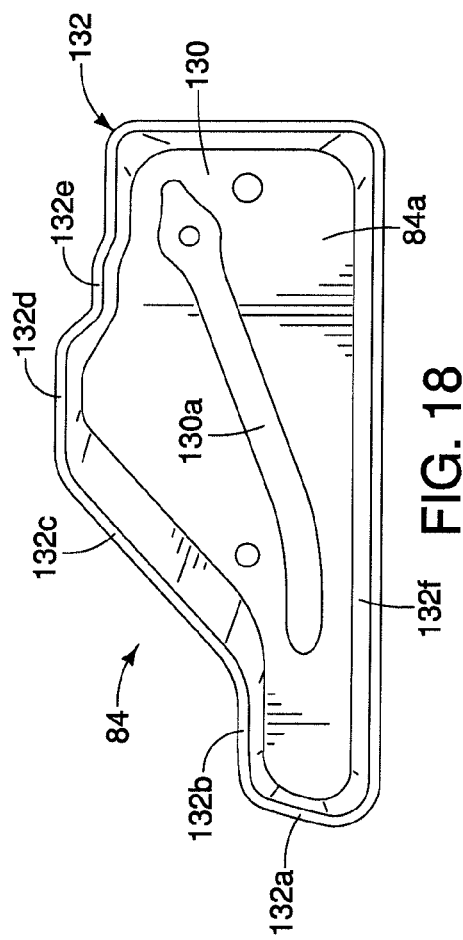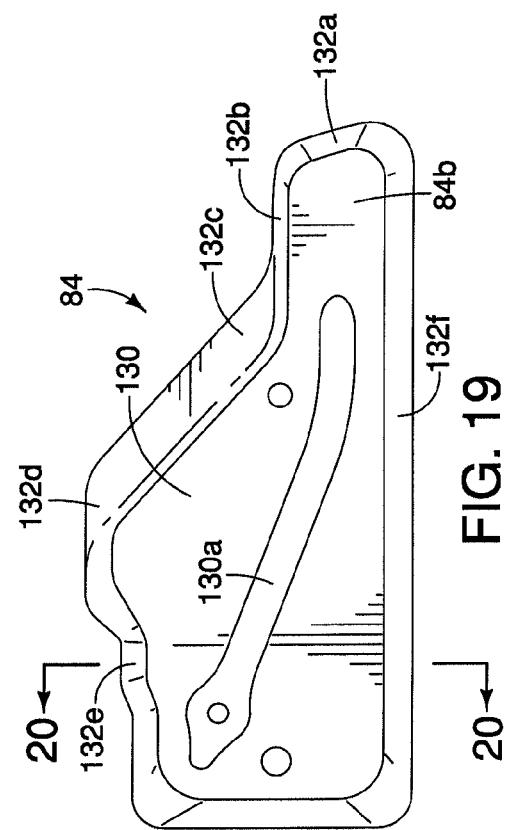

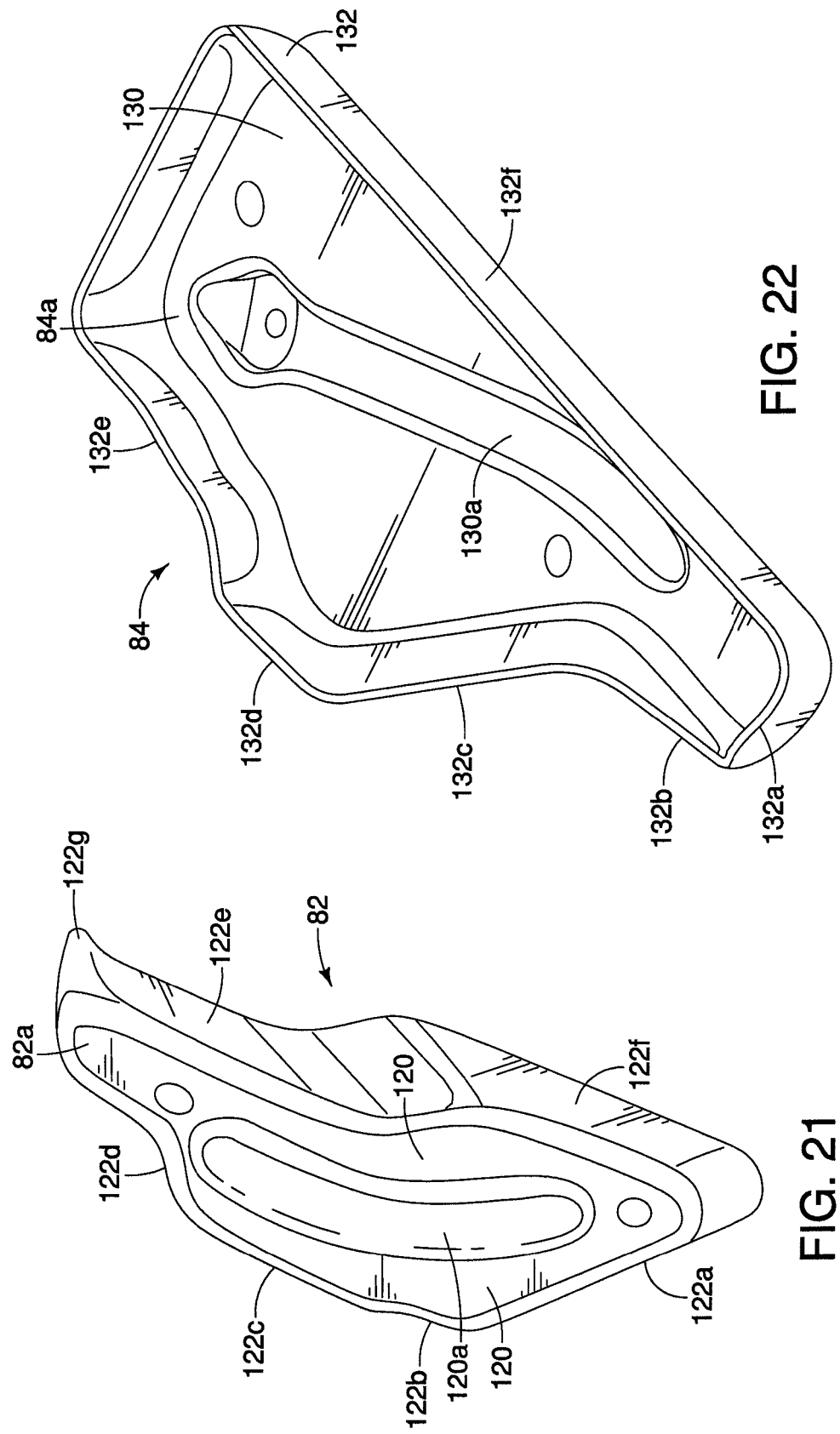

VEHICLE SLIDING DOOR STRUCTURE

BACKGROUND OF THE INVENTION

1. Field of the Invention

The present invention relates to a vehicle sliding door structure. More specifically, the present invention relates to a sliding door structure having a reinforced bow-resisting sliding door section.

2. Background Information

For many years, vehicles, such as passenger vans and commercial vans, have been equipped with one or more sliding doors. Such sliding doors typically include at least two fixed tracks and corresponding sliding mechanisms that support the sliding door for sliding movement between a closed position and an open position. The sliding door also includes at least one of a front latching mechanism and a rear latching mechanism that selectively retain the sliding door in the closed position.

Typically, the front and rear latching mechanisms are installed about mid-way up each side of the sliding door. The latching mechanisms engage strikers (fixed bars) attached to the vehicle structure on opposite sides of the opening in the side of the vehicle.

In view of the above, it will be apparent to those skilled in the art from this disclosure that there exists a need for an improved sliding door structure. This invention addresses this need in the art as well as other needs, which will become apparent to those skilled in the art from this disclosure.

SUMMARY OF THE INVENTION

One object of the present invention is to provide rigidity to a rearward and generally vertical section of a sliding door.

Another object of the invention is to locally stiffen the latch mechanism area of the sliding door for purposes of providing a sliding door with sufficient structural strength and rigidity.

In accordance with one embodiment of the present invention, a vehicle sliding door structure includes an inner door panel, an outer door panel, a reinforcing bracket and a first bulkhead. The inner door panel has an outer peripheral edge, an outboard facing surface and a vertically oriented reinforced section extending along an area of the outboard facing surface adjacent to a rearward side of the outer peripheral edge. The reinforced section has a latch mechanism supporting part with a latch opening located proximate a mid-region of the rearward side of the outer peripheral edge. The outer door panel is fixed to at least part of the outer peripheral edge of the inner door panel. The reinforcing bracket is fixedly attached to the outboard facing surface of the inner door panel along a region of the reinforced section that extends from below the latch mechanism supporting part to above the latch mechanism supporting part. The first bulkhead is fixedly attached to the reinforcing bracket and extends from the reinforcing bracket toward the outer door panel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 a side elevational view of the sliding door, shown removed from the vehicle structure with the outer door panel of the sliding door removed to reveal the inner door panel of the sliding door, the reinforced section of the inner door panel, the reinforcing bracket installed to the reinforced section of the inner door panel and the first and second bulkheads attached to the reinforcing bracket in accordance with the first embodiment of the present invention;

FIG. 6 is a schematic cross-sectional view of the vehicle and the sliding door taken along the line 6-6 in FIG. 2 showing sealing contact between a rearward side of the inner door panel of the sliding door and the vehicle structure in accordance with the first embodiment of the present invention;

FIG. 7 is a perspective view of the reinforcing bracket shown removed from the inner door panel of the sliding door with the first bulkhead and the second bulkhead pre-assembled to the reinforcing bracket in accordance with the first embodiment of the present invention;

FIG. 8 is a schematic cross-sectional view of an upper region of the reinforced section of the inner door panel of the sliding door taken along the line 8-8 in FIG. 5 showing the reinforcing bracket in solid lines and the outer door panel in phantom lines, in accordance with the first embodiment of the present invention;

FIG. 9 is a schematic cross-sectional view of a lower region of the reinforced section of the inner door panel of the sliding door taken along the line 9-9 in FIG. 5 with the outer door panel in phantom lines, in accordance with the first embodiment of the present invention;

FIG. 10 is a side elevational view of the reinforcing bracket with the first bulkhead and the second bulkhead pre-assembled to the reinforcing bracket shown removed from the sliding door in accordance with the first embodiment of the present invention;

FIG. 11 is a schematic cross-sectional view of an upper region of the reinforcing bracket taken along the line 11-11 in FIG. 10, showing the first bulkhead and the outer door panel in accordance with the first embodiment of the present invention;

FIG. 12 is a schematic cross-sectional view of a lower region of the reinforcing bracket taken along the line 12-12 in FIG. 10, showing the second bulkhead and the outer door panel in accordance with the first embodiment of the present invention;

FIG. 18 is a top view of the second bulkhead shown removed from the reinforcing bracket in accordance with the first embodiment of the present invention FIG. 19 is a bottom view of the second bulkhead shown removed from the reinforcing bracket in accordance with the first embodiment of the present invention FIG. 20 is a cross-sectional view of the second bulkhead taken along the line 20-20 in FIG. 19 in accordance with the first embodiment of the present invention;

FIG. 21 is a perspective view of the first bulkhead showing an upper side of the first bulkhead in accordance with the first embodiment of the present invention;

FIG. 22 is a perspective view of the second bulkhead showing an upper side of the second bulkhead in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
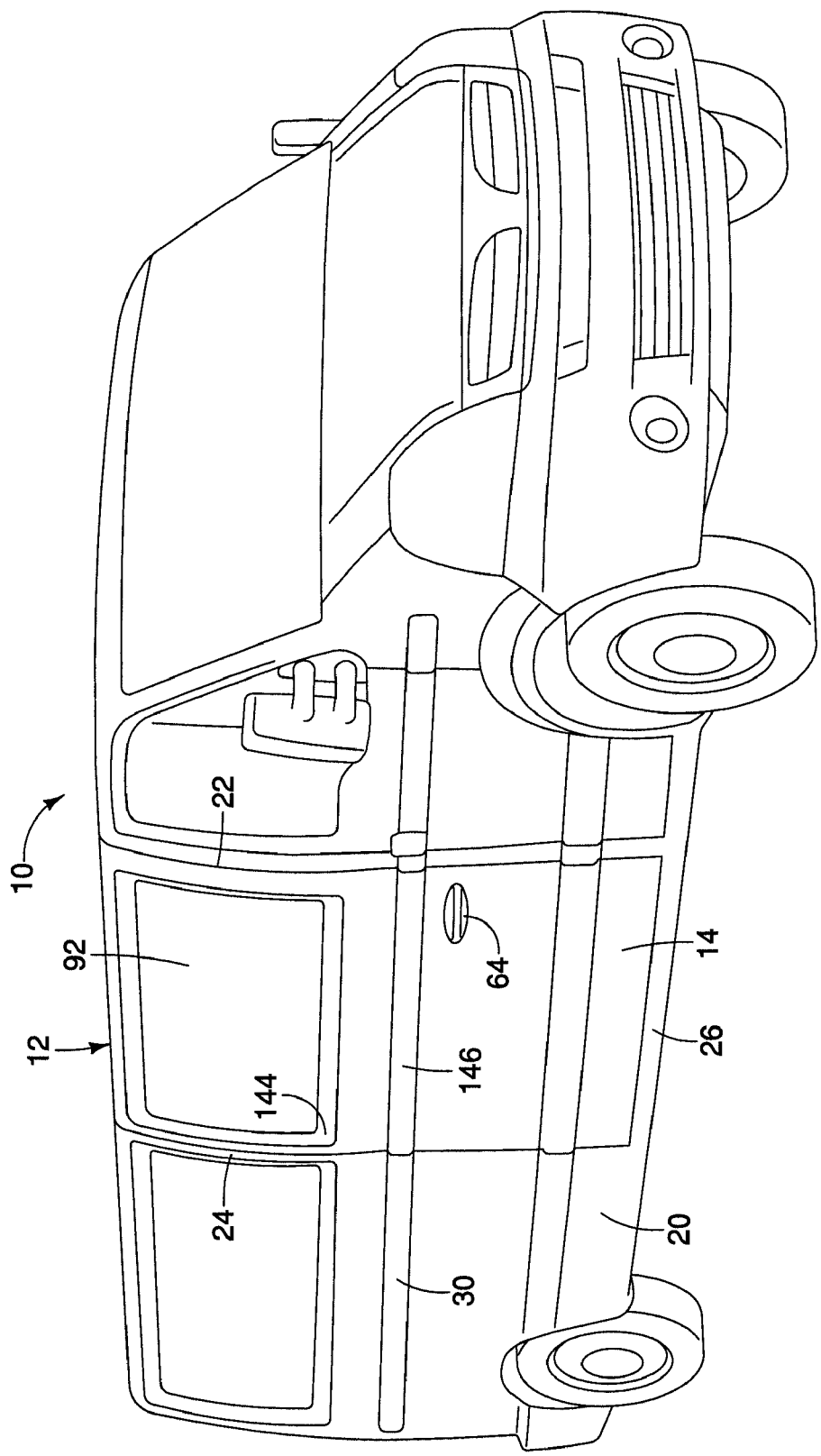
FIG. 1 is a perspective view of a vehicle showing a sliding door installed to a side portion of a vehicle structure of the vehicle in accordance with a first embodiment of the present invention.

Referring initially to FIG. 1, a vehicle 10 with a vehicle sliding door structure 12 that includes a sliding door 14 is illustrated in accordance with a first embodiment of the present invention. The vehicle sliding door structure 12 and the sliding door 14 are provided with a unique structure that is described in greater detail below.

Figure 3:
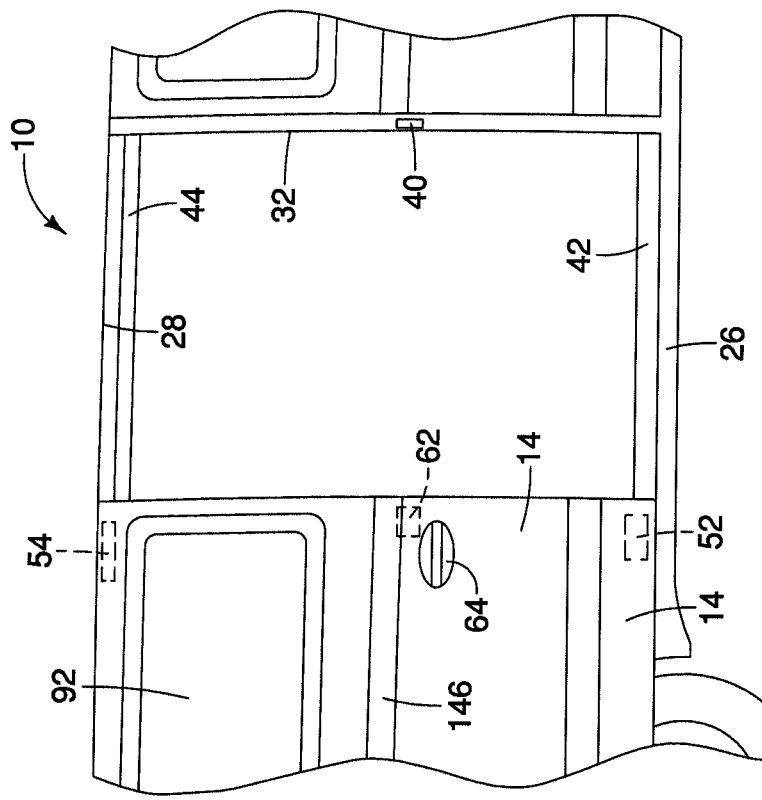
FIG. 3 is another side view of the vehicle showing the sliding door in an open position exposing an opening in the side of the vehicle structure in accordance with the first embodiment of the present invention.
Figure 2:
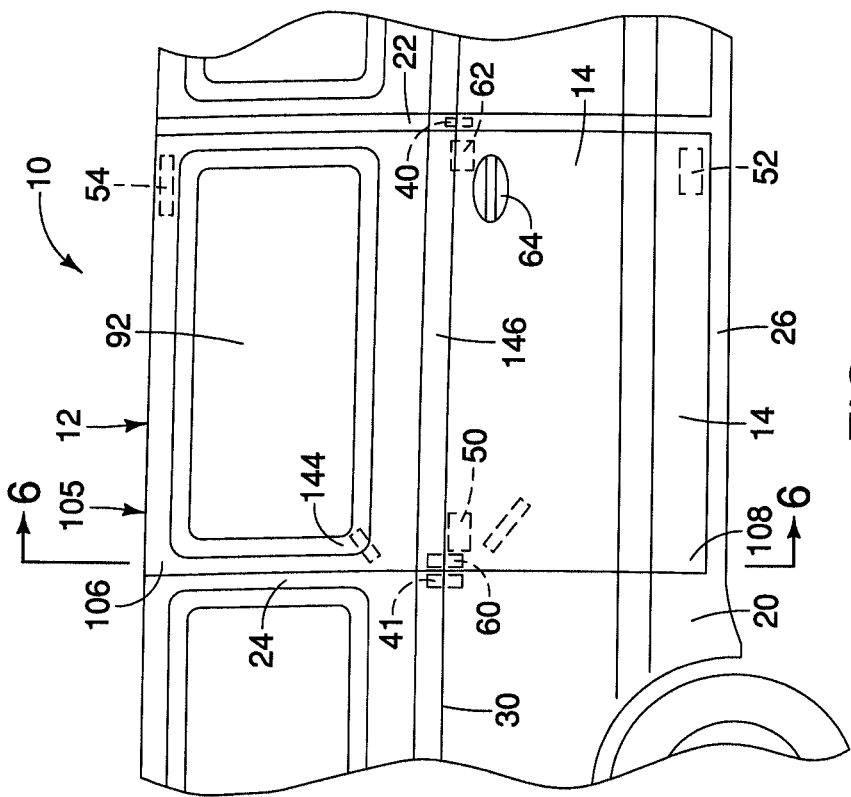
FIG. 2 is a side view of the vehicle showing the sliding door in a closed position in accordance with the first embodiment of the present invention.

First a brief description of portions of the vehicle 10 is provided with specific reference to FIGS. 1, 2 and 3. The vehicle 10 has a vehicle structure that includes, among other components, a side body panel 20, a B-pillar 22, a C-pillar 24, a lower support portion 26 and a roof rail 28. The B-pillar 22, the C-pillar 24, the lower support portion 26 and the roof rail 28 along with the sliding door 14 at least partially define the vehicle sliding door structure 12.

The side body panel 20 is supported by the B-pillar 22, the C-pillar 24, the lower support portion 26 and the roof rail 28 in a conventional manner. More specifically, the side body panel 20 is welded or otherwise fixedly attached to the B-pillar 22, the C-pillar 24, the lower support portion 26 and the roof rail 28. Various non-depicted structural elements of the vehicle 10 are conventional and description of these conventional components is omitted for the sake of brevity.

The side body panel 20 includes a side track 30 (indicated in FIGS. 1 and 2 only) and a door opening 32 (shown in FIG. 3 only). The side track 30 is a conventional sliding door component that is fixed to the side body panel 20, the C-pillar 24 and various structural components (not shown) within the vehicle 10. The side track 30 is partially concealed by a body contour formed in the body side panel 20. Since the structural components supporting the side track 30 and the side track 30 are conventional structural elements, further description is omitted for the sake of brevity. The side track 30 is configured to support the sliding door 14 for sliding movement between a closed position depicted in FIG. 2 and an open position depicted in FIG. 3.

The door opening 32 is formed in the side body panel 20 in a conventional manner. The door opening 32 is bordered by the B-pillar 22, the C-pillar 24, the lower support portion 26 and the roof rail 28. More specifically, the B-pillar 22 defines a front or forward side of the door opening 32, the C-pillar 24 defines a rear or rearward side of the door opening 32, the lower support portion 26 defines a lower side of the door opening 32 and the roof rail 28 defines an upper side of the door opening 22.

As best shown in FIG. 3, the B-pillar 22 includes a door striker 40 that defines part of a door latching mechanism (described further below). The C-pillar 24 includes another striker 41 (shown only in FIG. 2) that similarly defines part of the door latching mechanism. The lower support portion 26 includes a lower track 42 and the roof rail 28 includes an upper track 44, as indicated in FIG. 3.

The side track 30, the lower track 42 and the upper track 44 extend generally in directions parallel to one another and are configured to support the sliding door 14 for sliding movement between the closed position (FIG. 2) and the open position (FIG. 3). Since the side track 30, the lower track 42 and the upper track 44 are conventional sliding door components, further description of these components is omitted for the sake of brevity.

As best shown in FIG. 2 in phantom lines, the sliding door 14 includes components that enable the sliding movement of the sliding door 14. Specifically, the sliding door 14 includes a rear sliding mechanism 50, a lower sliding mechanism 52 and an upper sliding mechanism 54. The rear sliding mechanism 50 is a conventional mechanism that is configured and arranged to engage and slide along the side track 30. The lower sliding mechanism 52 is a conventional mechanism that is configured and arranged to engage and slide along the lower track 42. The lower sliding mechanism 52 is positioned to support a lower forward portion of the sliding door 14. The upper sliding mechanism 54 is a conventional mechanism that is configured and arranged to engage and slide along the upper track 44. The upper sliding mechanism 54 is positioned to support an upper forward portion of the sliding door 14.

Together, the rear sliding mechanism 50, the side track 30, the lower sliding mechanism 52, the lower track 42, the upper sliding mechanism 54 and the upper track 44 support the sliding door 14 to enable sliding movement of the sliding door 14 between the closed position (FIG. 2) and the open position (FIG. 3). Since the rear sliding mechanism 50, the lower sliding mechanism 52 and the upper sliding mechanism 54 are conventional components, further description is omitted for the sake of brevity.

As is also indicated in FIGS. 2 and 3, the sliding door 14 further includes a rear latching mechanism 60, an optional front latching mechanism 62 and a latch operating lever 64. The rear latching mechanism 60 is configured and arranged to selectively engage the striker 41 supported on the C-pillar 24. The front latching mechanism 62 is configured and arranged to selectively engage the striker 40 supported on the B-pillar 22. The front latching mechanism 62 is an optional feature of the present invention in that many sliding door configurations only require a single latching mechanism, typically located in a rearward portion of the door. It should be understood from the drawings and the description herein that although both the rear and front latching mechanisms 60 and 62 are shown included in the depicted embodiment, the present invention can be employed in a sliding door that includes only one latching mechanism. The latch operating lever 64 is operably connected via cable, linkages or electric solenoids to the rear latching mechanism 60 and the front latching mechanism 62 in a conventional manner. More specifically, the latch operating lever 64 can be operated by a person to cause the rear latching mechanism 60 and the front latching mechanism 62 to become disengaged from the striker 41 on the C-pillar 24 and the striker 40 supported on the B-pillar 22. Although not shown, another latch operating lever can be installed to an inboard surface (not shown) of the sliding door 14 such that a passenger within the vehicle 10 can open and close the sliding door 14 from inside the vehicle 10. The rear latching mechanism 60, the front latching mechanism 62 and the latch operating lever 64 are all conventional components. Therefore further description of the rear latching mechanism 60, the front latching mechanism 62 and the latch operating lever 64 is omitted for the sake of brevity.

A detailed description of the sliding door 14 is now provided with specific reference to FIGS. 4-25. With initial reference to FIG. 4, the sliding door 14 basically includes an inner door panel 70, brackets 72, 74, 76 and 78, a reinforcing bracket 80, a first bulkhead 82, a second bulkhead 84 and an outer door panel 86.

Figure 4:
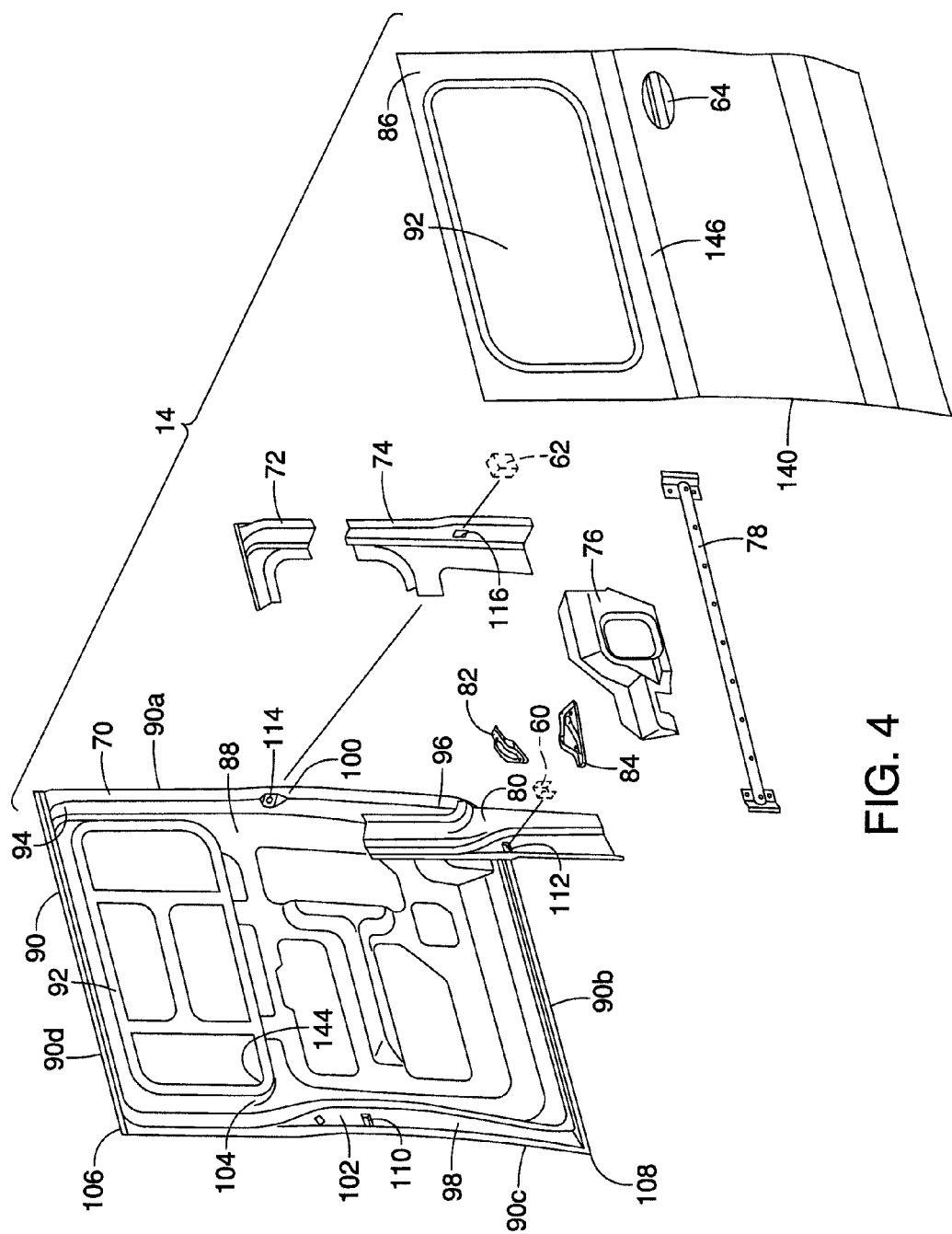
FIG. 4 is an exploded perspective view of the sliding door, shown removed from the vehicle structure showing an inner door panel of the sliding door, a reinforced section of the inner door panel, a reinforcing bracket, a first bulkhead, a second bulkhead, and an outer door panel in accordance with the first embodiment of the present invention.
Figure 13:
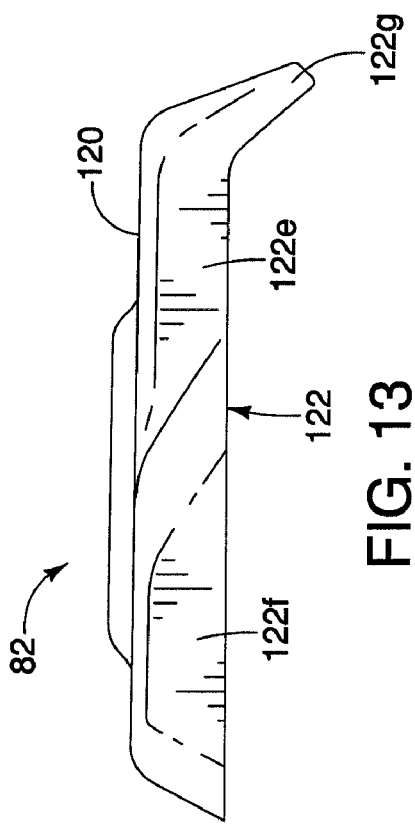
FIG. 13 is a side elevational view of the first bulkhead shown removed from the reinforcing bracket in accordance with the first embodiment of the present invention.
Figure 14:
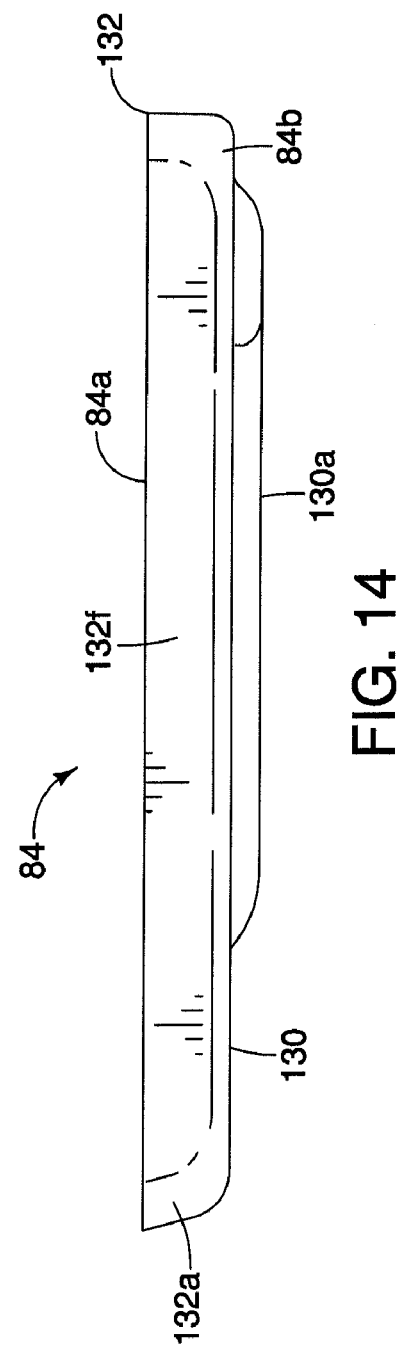
FIG. 14 is a side elevational view of the second bulkhead shown removed from the reinforcing bracket in accordance with the first embodiment of the present invention.

As best shown in FIGS. 4 and 5, the inner door panel 70 includes an outboard facing surface 88, an outer peripheral edge 90, a window section 92, an upper sliding mechanism support portion 94, a lower sliding mechanism support portion 96, a rear sliding mechanism support portion 98, a front latch mechanism support portion 100, a rear latch mechanism support portion 102, a reinforced section 104 and a sash section 105 (FIG. 5 only).

The outer peripheral edge 90 includes a front side 90a, a lower side 90b, a rear side 90c and an upper side 90d. The window section 92 is an area of the inner door panel 70 configured to receive an optional pane of glass for a window. Hence, the sliding door 14 can include a window. The sliding door 14 of the present invention can be a commercial vehicle with a solid exterior that does not include a window. Alternatively, the sliding door 14 can be a passenger vehicle that includes a glass window. However, in the depicted embodiment, the outline of a window is indicated in the outer door panel 86, but no glass window is included in the depicted embodiment.

The inner door panel 70 also has an upper rear corner 106 and a lower rear corner 108. The upper rear corner 106 is located at the intersection of the rear side 90c and the upper side 90d of the outer peripheral edge 90. The lower rear corner 108 is located at the intersection of the rear side 90c and the lower side 90b of the outer peripheral edge 90.

An inboard surface (not shown) of the inner door panel 70 at the upper sliding mechanism support portion 94 is configured to receive and support the upper sliding mechanism 54, as indicated in phantom in FIGS. 2 and 5. The lower sliding mechanism support portion 96 is configured to receive and support the lower sliding mechanism 52, as is also indicated in FIGS. 2 and 5. The brackets 72 and 74 are fixed to the outboard facing surface 88 such that the bracket 72 provides reinforcement to the region around the upper sliding mechanism support portion 94 and the bracket 74 provides reinforcement to the region around the front latch mechanism support portion 100.

The rear sliding mechanism support portion 98 (and a corresponding portion of the reinforcing bracket 80) are configured to support the rear sliding mechanism 50 in a conventional manner. The rear latch mechanism support portion 102 is configured to support the rear latching mechanism 60. Further, as shown in FIGS. 4 and 5, the rear latch mechanism support portion 102 includes a latch opening 110 and the reinforcing bracket 80 is provided with a latch opening 112 such that the rear latching mechanism 60 can selectively engage the striker (not shown) fixed to the C-pillar 24 in a conventional manner. With the reinforcing bracket 80 fixed to outboard facing surface 88 of the inner door panel 70 at the rear latch mechanism support portion 102, the latch opening 110 and the latch opening 112 are aligned with one another.

The front latch mechanism support portion 100 and the bracket 74 are similarly configured to support the front latching mechanism 62. The front latch mechanism support portion 100 of the inner door panel 70 is provided with a latch opening 114 and the bracket 74 is similarly provided with a latch opening 116, as indicated in FIGS. 4 and 5. With the bracket 74 fixed to the front latch mechanism support portion 100 by, for example welding techniques, the latch opening 114 is aligned with the latch opening 116.

A description of the reinforced section 104 of the inner door panel 70 is now provided with specific reference to FIGS. 5, 8 and 9. The reinforced section 104 is a stiffened portion of the inner door panel 70. The reinforced section 104 extends vertically from the upper side 90d of the outer peripheral edge 90 of the inner door panel 70 to the lower side 90c of the outer peripheral edge 90 of the inner door panel 70. Further, the reinforced section 104 extends along the rear side 90c of the outer peripheral edge 90 of the inner door panel 70.

The reinforced section 104 is a vertically oriented portion of the inner door panel 70 extending along an area of the outboard facing surface 88 adjacent to the rear side 90c (the rearward side of the outer peripheral edge 90). The rear latch mechanism support portion 102 (a latch mechanism supporting part) and the latch opening 110 are located within the reinforced section 104. More specifically, the rear latch mechanism support portion 102 and the latch opening 110 are located proximate a mid-region of the rear side 90c of the outer peripheral edge 90 within the region of the inner door panel 70 that constitutes the reinforced section 104. It should be understood from the drawings and description herein that the reinforced section 104 is located along an edge of the inner door panel 70 that corresponds to the location of the rear latch mechanism support portion 102 and the sash section 105 of the sliding door 14. More specifically, the reinforced section 104 is not necessarily located at a rearward side of the sliding door 14, but rather is positioned within the sliding door 14 to provide strength and rigidity to the reinforced portion 104 and the sash section 105. For example, in a vehicle where the sliding door moves in a forward direction to open, the reinforced section 104 can be located at a forward region of the sliding door 14. In other words, rearward and forward directions with respect to the reinforced section 104 are with reference to the vehicle 10 and are not intended to limit the location and/or orientation of the reinforced section 104 in any way.

The reinforced section 104 extends from the rear side 90c of the outer peripheral edge 90 of the inner door panel 70 toward the front side 90a of the outer peripheral edge 90 of the inner door panel 70. However as indicated in FIG. 5, the reinforced section 104 preferably has a width $W_1$, measured relative to a front-back overall width $W_2$ of the inner door panel 70. The width $W_1$ is preferably greater than 5 percent of the width $W_2$ of the inner door panel 70 but preferably less than 25 percent of the width $W_2$ of the inner door panel 70. In the depicted embodiment the width $W_1$ is approximately 20 percent of the width $W_2$ of the inner door panel 70.

The reinforced section 104 includes a plurality of vertically extending surfaces formed along the outboard facing surface 88, as best shown in FIGS. 8 and 9. These vertically extending surfaces are contoured such that they change in width and depth going from the upper side 90d to the lower side 90b of the inner door panel 70. For instance, in an upper cross-section shown in FIG. 8, surfaces 104a, 104b, 104c, 104d and 104e are visibly angularly offset from one another. A lower cross-section shown in FIG. 9 shows that the surfaces 104a, 104b, 104c, 104d and 104e are still angularly offset from one another, but have differing widths when compared to FIG. 8. Further, additional contoured surfaces, such as surfaces 104f and 104g are formed in lower regions of the reinforced section 104. It should be understood from the drawings and description herein that the reinforced section 104 includes other contoured surfaces in addition to the surfaces 104a, 104b, 104c, 104d, 104e, 104f and 104g. Further, the surfaces 104a, 104b, 104c, 104d, 104e, 104f and 104g are preferred ones of a plurality of contoured surfaces mentioned to exemplify the types of contoured surfaces of the reinforced section 104.

It should also be understood from the drawings and the description herein that the reinforced section 104 can have any of a variety of shapes and configurations. In other words, the present invention is not limited to the depicted shapes of contoured surfaces of the reinforced section 104.

As indicated in FIG. 5, the sash section 105 (indicated by a triangular shaped dashed line) is a portion of the sliding door 14 that is cantilevered from the upper sliding mechanism support portion 94 and the rear sliding mechanism support portion 98. The sliding door 14 has three regions that support the sliding door 14 to the vehicle 10. Specifically, the upper sliding mechanism support portion 94, the lower sliding mechanism support portion 96 and the rear sliding mechanism support portion 98 support the sliding door 14 to the vehicle 10.

As indicated in FIGS. 4 and 5, the brackets 72, 74, 76 and 78 are all rigidly attached to the inner door panel 70 in order to provide stiffness or rigidity to the inner door panel 70 in the regions where the brackets 72, 74, 76 and 78 are installed. Specifically, the bracket 72 reinforces the upper sliding mechanism support portion 94 of the inner door panel 70. The bracket 74 reinforces the front latch mechanism support portion of the inner door panel 70. The bracket 76 reinforces a lower front portion of the inner door panel 70 adjacent to and surrounding the lower sliding mechanism support portion 98 and the rear latch mechanism support portion 102 of the inner door panel 70. The bracket 78 extends between a forward portion of the bracket 76 and the rear side 90c of the outer peripheral edge 90 of the inner door panel 70. The brackets 72, 74, 76 and 78 are preferably welded in position to a corresponding section of the outboard facing surface 88 of the inner door panel 70.

A description of the reinforcing bracket 80 is now provided with specific reference to FIGS. 7, 8, 10, 11 and 12. The reinforcing bracket 80 is preferably made of a sheet metal material that is formed to achieve the shapes and contours depicted in FIGS. 7 and 10. The reinforcing bracket 80 has an approximate overall vertical height that is preferably about half the overall vertical height of the inner door panel 70. However, it should be understood from the drawings and the description herein that the overall height of the reinforcing bracket 80 can vary depending upon the design and configuration of the sliding door 14. Consequently the reinforcing bracket 80 can have a vertical height that is smaller or larger than the depicted height. The reinforcing bracket 80 is preferably fixedly attached to the outboard facing surface 88 of the inner door panel 70 along a region of the reinforced section 104 that extends from below the rear latch mechanism support portion 102 to above the rear latch mechanism support portion 102 (the latch mechanism supporting part). Additionally, the reinforcing bracket 80 can also extend to below the rear slider mechanism support portion 98, as shown in FIG. 5. The reinforcing bracket 80 is preferably welded to the inner door panel 70 but can alternatively be attached by a plurality of fastening elements.

The reinforcing bracket 80 includes a plurality of contoured surface sections, such as the surface sections 80a, 80b, 80c, 80d, 80e, 80f, 80g and 80h that are angularly offset from one another when viewed in cross-section, as indicated in FIGS. 7, 8, 11, 12 and 23-25. As best shown in FIGS. 11 and 12, the surface sections 80a, 80b, 80c, 80d and 80e are dimensioned for attachment to corresponding flange sections (described below) of the first bulkhead 82. Further, the surface sections 80a, 80b, 80c, 80f, 80g and 80h are dimensioned for attachment to corresponding flanges (described below) of the second bulkhead 84.

A description of the first bulkhead 82 is now provided with specific reference to FIGS. 10, 11, 13, 15-17, 21 and 23-25. The first bulkhead 82 is a bracing member preferably made of metal that is attached to the reinforcing bracket 80 and extends from the reinforcing bracket 80 toward the outer door panel 86. The first bulkhead 82 is attached to the reinforcing bracket 80 above the rear latch mechanism support portion 102.

Figure 17:
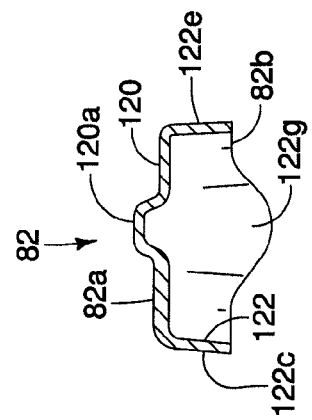
FIG. 17 is a cross-sectional view of the first bulkhead taken along the line 17-17 in FIG. 15 in accordance with the first embodiment of the present invention.
Figure 25:
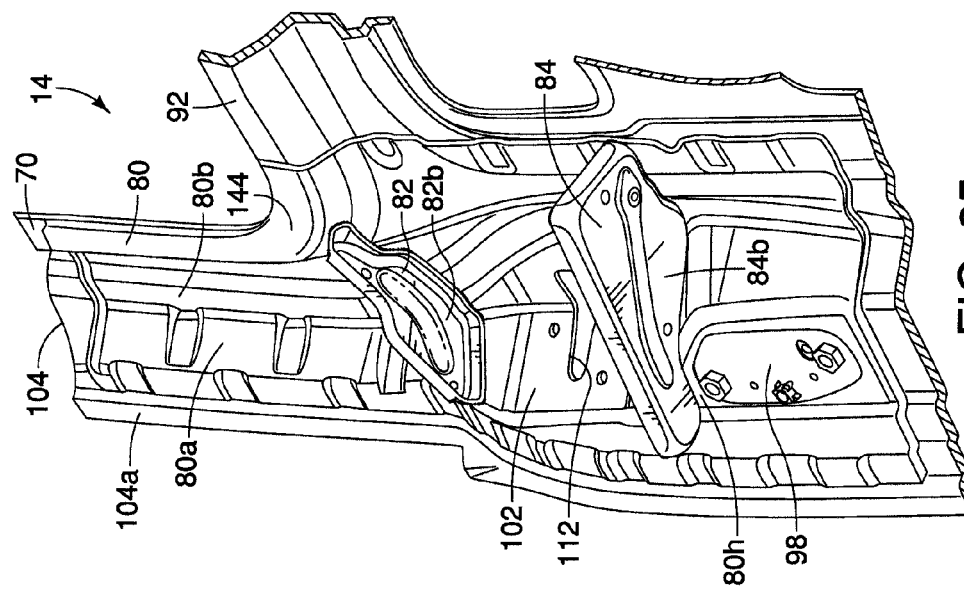
FIG. 25 is a cut-away perspective view of a portion of the outboard surface of the inner door panel of the sliding door looking upward from the forward side of the sliding door showing the reinforcing bracket, the first bulkhead and the second bulkhead installed to the reinforced section of the inner door panel in accordance with the first embodiment of the present invention.

The first bulkhead 82 includes a central flat part 120 and a flange 122 that encircles the central flat part 120. The first bulkhead 82 has an inverted bowl shape when viewed in cross-section, as shown in FIG. 17. Consequently as indicated in FIGS. 7, 11, 15, 23 and 24, the first bulkhead 82 has an overall convex shape when viewed from above. As indicated in FIGS. 16 and 25, the first bulkhead 82 an overall concave shape when viewed from below.

Figure 16:
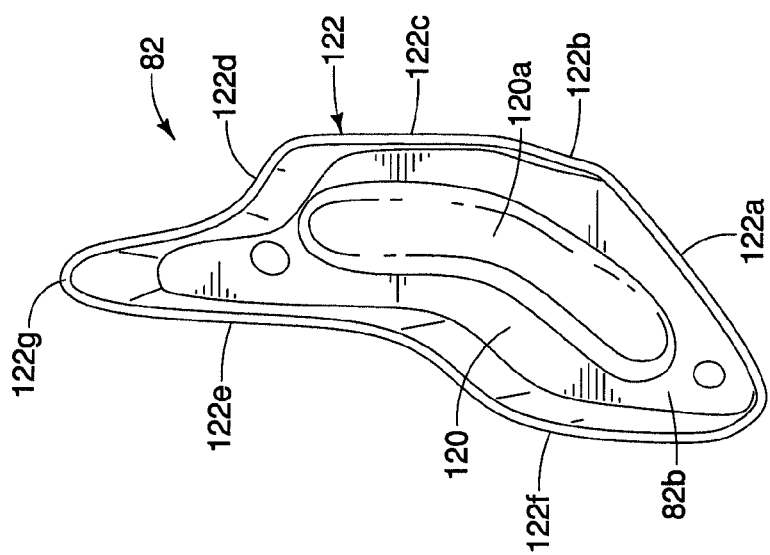
FIG. 16 is a bottom view of the first bulkhead shown removed from the reinforcing bracket in accordance with the first embodiment of the present invention
Figure 15:
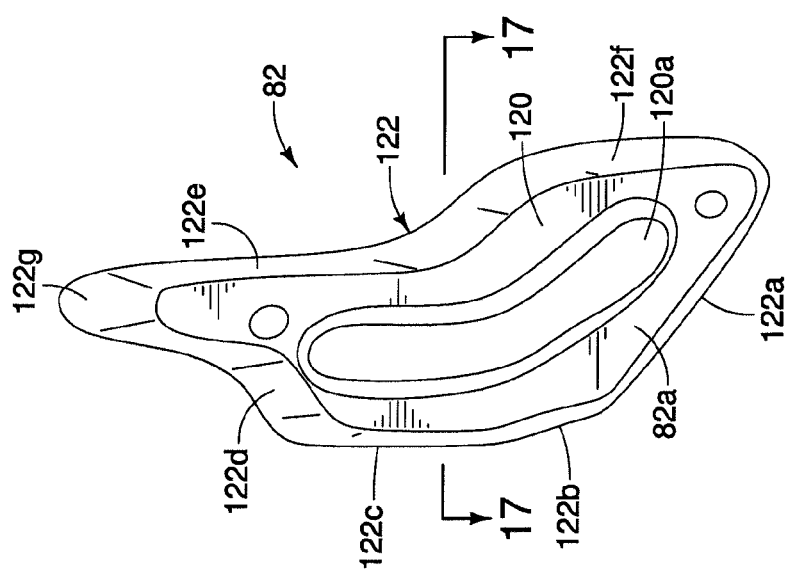
FIG. 15 is a top view of the first bulkhead shown removed from the reinforcing bracket in accordance with the first embodiment of the present invention

As indicated in FIGS. 15-17, the central flat part 120 includes a contoured section 120a that is convex on an upper side 82a of the first bulkhead 82 and is concaved on a lower side 82b of the first bulkhead 82. The contoured section 120a has a curved shape and is included to provide rigidity to the central flat part 120 of the first bulkhead 82.

The flange 122 includes a plurality of flange sections 122a, 122b, 122c, 122d, 122e, 122f and 122g. The flange sections 122a, 122b, 122c and 122d are preferably fixed to corresponding surfaces of the reinforcing bracket 80. Specifically, as best shown in FIG. 11, the flange section 122a is fixed to the surface section 80a of the reinforcing bracket 80; the flange section 122b is fixed to the surface section 80b of the reinforcing bracket 80; the flange section 122c is fixed to the surface section 80c of the reinforcing bracket 80; and the flange section 122d is fixed to the surface section 80d of the reinforcing bracket 80. As indicated in FIG. 10, the flange section 122g extends under a curved portion of the surface section 80e of the of the reinforcing bracket 80 and is fixed thereto. The flange sections 122a, 122b, 122c, 122d and 122g are preferably welded to the reinforcing bracket 80 using conventional welding techniques or are otherwise rigidly fixed to the reinforcing bracket 80. The curved portion of the surface section 80e corresponds to the shape of a perimeter 144 of the window section 92. With the flange section 122g being welded or otherwise fixed to the surface section 80e and the flange section 122a being welded or otherwise fixed to the surface section 80a of the reinforcing bracket 80, the first bulkhead 82 effectively spans between the rear side 90c of the inner door panel 70 and the window section 92.

As indicated in FIG. 11, the flange sections 122e and 122f of the first bulkhead 82 are fixed to the outer door panel 86. The flange sections 122e and 122f are preferably connected to an inner surface 86a of the outer door panel 86 by a mastic or adhesive, but can alternatively be welded to the outer door panel 86.

As indicated in FIG. 5, the central flat part 120 of the first bulkhead 84 extends in a first direction $D_1$ and the upper side 90d of the outer peripheral edge 90 extends in a second direction $D_2$. The first and second directions $D_1$ and $D_2$ are angularly offset from one another by an acute angle $\alpha_1$, as indicated in FIG. 5. The actual angular orientation of the first bulkhead 84 can be altered, depending upon the overall sliding door configuration and dimensions. In the depicted embodiment, the angle $\alpha_1$ is an acute angle and is advantageous in that the first bulkhead 84 can span between the rear side 90c and an adjacent perimeter 144 of the window section 92, as described in greater detail below. It should be understood that the angle $\alpha_1$ can be any angle less that 90 degrees, but is preferably less than 45 degrees, and still more preferably less than 25 degrees. Further, as shown in alternate embodiments described below, the angle $\alpha_1$ can be 0 degrees such that the first and second directions $D_1$ and $D_2$ are essentially parallel to one another. A description of the second bulkhead 84 is now provided with specific reference to FIGS. 10, 12, 14 and 18-22. The second bulkhead 84 is a bracing member preferably made of metal that is attached to the reinforcing bracket 80 and extends from the reinforcing bracket 80 toward the outer door panel 86, as indicated in FIG. 12. The second bulkhead 84 is attached to the reinforcing bracket 80 below the rear latch mechanism support portion 102.

The second bulkhead 84 includes a central flat part 130 and a flange 132 that encircles the central flat part 130. The second bulkhead 84 has a bowl shape when viewed in cross-section, as shown in FIG. 20. Consequently as indicated in FIGS. 7, 12, 18, 22, 23 and 24, the second bulkhead 84 has an overall concave shape when viewed from above. As indicated in FIGS. 19 and 25, the second bulkhead 84 an overall convex shape when viewed from below.

As indicated in FIGS. 18, 20 and 22, the central flat part 130 includes a contoured section 130a that is convex on an upper side 84a of the second bulkhead 84 and is concaved on a lower side 84b of the second bulkhead 84. The contoured section 130a has a curved shape and is included to provide rigidity to the central flat part 130 of the second bulkhead 84.

The flange 132 includes a plurality of flange sections 132a, 132b, 132c, 132d, 132e and 132f. The flange sections 132a, 132b, 132c and 132d are preferably fixed to corresponding surfaces of the reinforcing bracket 80, as depicted in FIG. 12. Specifically, the flange section 132a is fixed to the surface section 80a of the reinforcing bracket 80; the flange section 132b is fixed to the surface section 80b of the reinforcing bracket 80; the flange section 132c is fixed to the surface section 80g of the reinforcing bracket 80; the flange section 132d is fixed to the surface section 80c of the reinforcing bracket 80; and the flange section 132e is fixed to the surface section 80f of the reinforcing bracket 80. The flange sections 132a, 132b, 132c and 132d are preferably welded to the reinforcing bracket 80 using conventional welding techniques or otherwise rigidly fixed to the reinforcing bracket 80.

As also indicated in FIG. 12, the flange section 132f of the second bulkhead 84 can optionally be fixed to the outer door panel 86. The flange section 132f can optionally be connected to an inner surface 86a of the outer door panel 86 by a mastic or adhesive, and can alternatively be welded to the outer door panel 86.

As shown in FIG. 5, the central flat part 130 of the second bulkhead 84 extends in a third direction $D_3$. The first direction $D_1$ of the first bulkhead 82 and the third direction $D_3$ of the second bulkhead 84 are angularly offset from one another by an acute angle $\alpha_2$, as indicated in FIG. 5. As is also indicated in FIG. 5, third direction $D_3$ of the central flat part 130 of the second bulkhead 84 and the second direction $D_2$ of the upper side 90d of the outer peripheral edge 90 are also angularly offset from one another by an acute angle. As mentioned above with respect to the first bulkhead 82, the angle $\alpha_2$ depicted in FIG. 5 is a preferred embodiment of the present invention. However, the angle $\alpha_2$ can be altered such that the first bulkhead 82 and second bulkhead 84 are oriented in directions that are parallel to one another, as shown in alternate embodiments described below. Further, the angle $\alpha_2$ can be 0 degrees but is preferably less than 90 degrees. Still more preferably, the angle $\alpha_2$ is less than 30 degrees.

The first bulkhead 82, the second bulkhead 84 and the reinforcing bracket 80 can be pre-assembled as a single unit prior to assembly of the sliding door 14. Hence, the first bulkhead 82 and the second bulkhead 84 and the reinforcing bracket 80 together define a single sub-assembly or sub-unit structure of the sliding door 14.

A description of the outer door panel 86 is now provided with specific reference to FIGS. 1, 2, 4, 8, 9, 11 and 12. The outer door panel 86 has an outer appearance (FIGS. 1, 2 and 4) that conforms to the overall shape of the vehicle 10. The outer door panel 86 includes an outer peripheral edge 140 that is welded or otherwise fixed to the outer peripheral edge 90 of the inner door panel 70 in a conventional manner. More specifically, the outer peripheral edge 140 of the outer door panel 86 is fixed to the outer peripheral edge 90 of the inner door panel 70.

The outer door panel 86 also includes the window section 92 (FIGS. 1-4) that can be a solid metallic area, unitarily formed with the rest of the inner door panel 70, or alternatively can be cut out in order to receive window glass (not shown). The outer door panel 86 can also include a contoured area 146, as indicated in FIGS. 1-4, 6 and 11. The contoured area 146 is preferably aligned with the side track 30 in order to provide the side body panel 20 and the outer door panel 86 with a consistent appearance with the sliding door 14 in the closed position.

Figure 23:
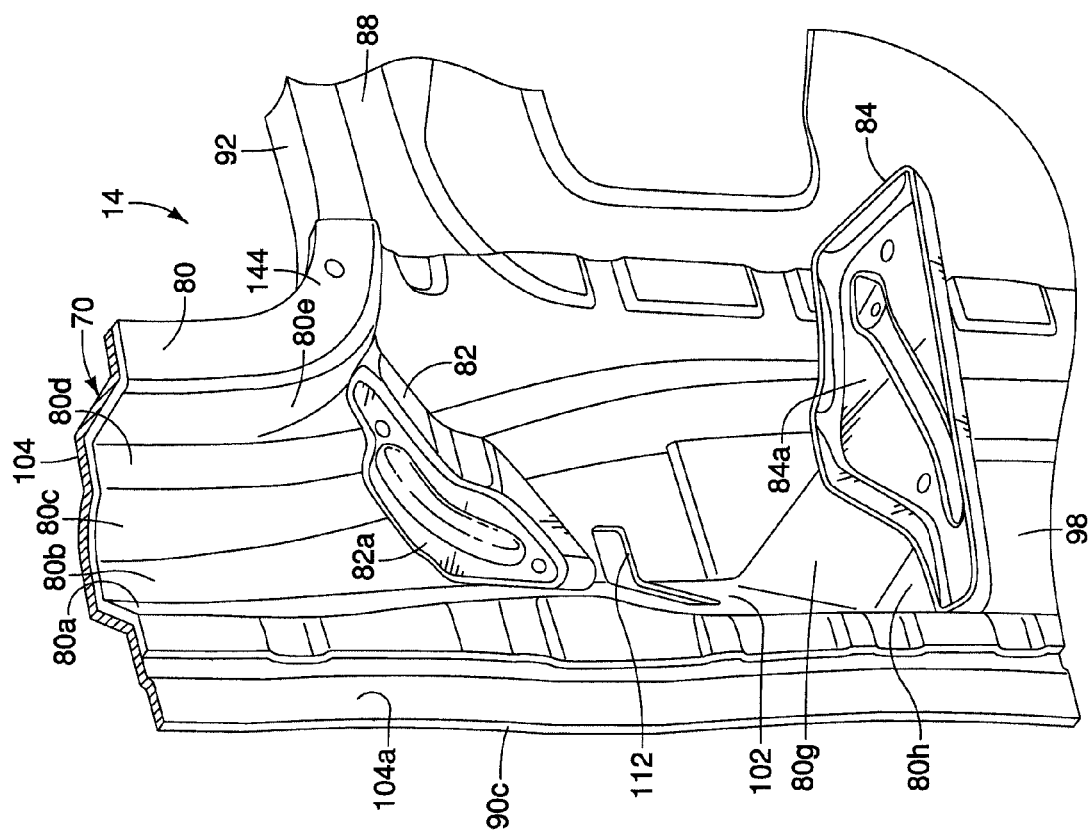
FIG. 23 is a cut-away perspective view of a portion of an outboard facing surface of the inner door panel of the sliding door looking downward from a rearward side of the sliding door showing the reinforcing bracket, the first bulkhead and the second bulkhead installed to the reinforced section of the inner door panel in accordance with the first embodiment of the present invention.
Figure 24:
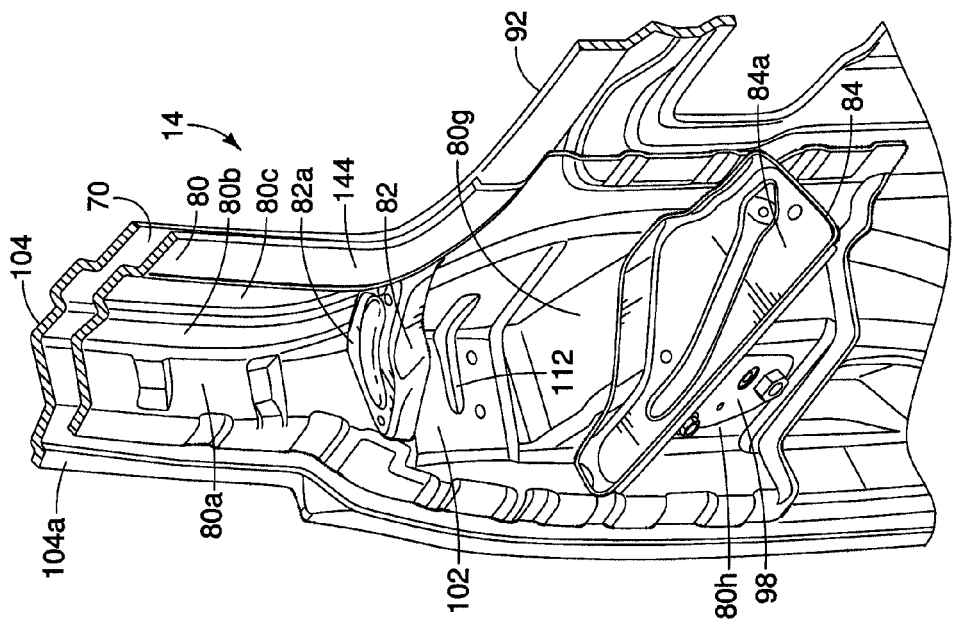
FIG. 24 is a cut-away perspective view of a portion of the outboard facing surface of the inner door panel of the sliding door looking downward from a forward side of the sliding door showing the reinforcing bracket, the first bulkhead and the second bulkhead installed to the reinforced section of the inner door panel in accordance with the first embodiment of the present invention.

As shown in FIGS. 23, 24 and 25, the first bulkhead 82 and the second bulkhead 84 are fixed to the reinforcing bracket 80 but are not necessarily parallel to one another. Further, the reinforcing bracket 80 is further welded to the reinforced section 104 of the inner door panel 70. The first bulkhead 82 and the second bulkhead 84 provide the reinforcing bracket 80 and the reinforced section 104 of the sliding door 14 with a rigidity that is beneficial to the entire vertical length of the reinforced section 104 of the inner door panel 70 and hence to the entire sliding door 14. Specifically, the first and second bulkheads 82 and 84 essentially create hat sections or boxed in sections above and below the rear latch mechanism support portion 102 of the inner door panel 70 of the sliding door 14. Hence the region around the rear latch mechanism support portion 102 of the inner door panel 70 is reinforced providing strength and rigidity. The sliding door 14 is more reliably retained in the closed position with the first and second bulkheads 82 and 84 installed to the reinforcing bracket 80. Further, the strength and rigidity of the reinforced section 104 extends to the sash section 105. In other words, the sash section 105 of the sliding door 14 is provided with rigidity and strength as a result of inclusion of the first and second bulkheads 82 and 84 on the reinforcing bracket 80.

As indicated in FIGS. 2 and 3, the sliding door 14 is supported on the vehicle 10 by three sliding mechanisms. Specifically, the sliding door 14 is supported by the lower sliding mechanism 52, the upper sliding mechanism 54 and the rear sliding mechanism 50. More specifically, the lower sliding mechanism 52 supports a lower front of area of the sliding door 14, the upper sliding mechanism 54 supports a front upper area of the sliding door 14 and the rear sliding mechanism 50 supports a central rear area of the sliding door 14. Therefore, the upper rear corner 106 and the lower rear corner 108 are basically cantilevered from the rear sliding mechanism 50.

As shown in FIG. 6, the sliding door 14 can be designed to include a slight curvature, when viewed in cross-section. The vehicle 10 also has a corresponding curvature, as is indicated in the overall shape of the C-pillar 24. A seal S can preferably be installed along one of the following: 1) continuously all the way around and adjacent to the outer peripheral edge 90 of the inner door panel 70 of the sliding door 14; or 2) along the B-pillar 22, the C-pillar 24, the roof rail 28, and to the lower support portion 26 (adjacent to the door opening 32), as indicated in FIG. 6. Regardless of the installation location of the seal S, the seal S is dimensioned and configured to provide a water tight seal between the outer peripheral edge 90 of the inner door panel 70 of the sliding door 14 and the B-pillar 22, the C-pillar 24, the roof rail 28 and the lower support portion 26 of the vehicle 10.

The construction of the reinforced section 104, with the reinforcing bracket 80, the first bulkhead 82 and the second bulkhead 84 is such that the sash section 105 of the sliding door 14 remains rigid and retains its original shape relative to the remainder of the sliding door 14. Consequently, the seal between the rear side 90c of the outer peripheral edge 90 of the inner door panel 70 of the sliding door 14 and the C-pillar 24 of the vehicle 10 can also be more reliable during the life of the vehicle 10.

More specifically, the overall shape of the reinforced section 104, with the surfaces 104a, 104b, 104c, 104d, 104e, 104f and 104g, the overall shape of the reinforcing bracket 80 with the surface sections 80a, 80b, 80c, 80d, 80e, 80f, 80g and 80h, along with the first bulkhead 82 and the second bulkhead 84, provide rear side 90c of the sliding door 14 with a stable, rigid shape. The overall shape of the reinforced section 104, the overall shape of the reinforcing bracket 80, the first bulkhead 82 and the second bulkhead 84 provide the sliding door with stiffness or rigidity in the vertical direction minimizing flexing and deflection of the rear side 90c of the sliding door relative to the rear sliding mechanism support portion 98 and the rear latch mechanism support portion 102 of the inner door panel 70 of the sliding door 14. For example, as shown in FIG. 11, the surface 104b is welded or otherwise fixed to the reinforcing bracket 80 at the surface section 80a, and the surface 104e is welded or otherwise fixed to the reinforcing bracket 80 at the surface section 80d. As mentioned above, the flange section 122a is welded or otherwise fixed to the surface section 80a of the reinforcing bracket 80 and the flange section 122d is welded or otherwise fixed to the surface section 80d of the reinforcing bracket 80. The surface 104e at least partially defines the perimeter 144 of the window section 92 and the surface 104b is adjacent to the rear side 90c of the inner door panel 70. Consequently, as indicated in FIG. 11, the first bulkhead 82 bridges the distance between the surface sections 80a and 80d, and consequently bridges the distance between the surface 104a and the surface 104e of the reinforced section 104 of the inner door panel 70. In effect, the first bulkhead 82 bridges the space between the rear side 90c and the window section 92 of the inner door panel 70.

A description of a method of assembling the sliding door 14 is now provided. First, the inner door panel 70 is manufactured such that the inner door panel 70 is provided with the outer peripheral edge 90, the outboard facing surface 88 and the vertically oriented reinforced section 104. The reinforced section 104 can have any of a variety of shapes and is not limited to the contoured surfaces depicted in the drawings. The reinforced section 104 can have more or fewer contoured surfaces in order to provide the prescribed rigidity and stiffness. The reinforced section 104 preferably extends along an area of the outboard facing surface 88 adjacent to the rear side 90c of the outer peripheral edge 90. The reinforced section 104 is further provided with the rear sliding mechanism support portion 98, the rear latch mechanism support portion 102 and the latch opening 110 located proximate a mid-region of the rear side 90c.

The reinforcing bracket 80 is manufactured with an overall shape that mates with portions of the reinforced section 104 of the inner door panel 70. The first bulkhead 82 is fixed on the reinforcing bracket 80. Further, the reinforcing bracket 80 is attached to the outboard facing surface 88 of the inner door panel 70 along the reinforced section 104 such that the reinforcing bracket 80 extends from a region below the rear latch mechanism support portion 102 (the latch mechanism supporting part) to a region above the rear latch mechanism support portion 102. Additionally, the reinforcing bracket 80 can extend from a region below the rear sliding mechanism support portion 98 to the region above the rear latch mechanism support portion 102, as shown in FIG. 5.

The outer door panel 86 is attached to the outer peripheral edge 90 of the inner door panel 70 such that the first bulkhead 82 extends from the reinforcing bracket 80 and the inner door panel 70 toward an inboard surface of the outer door panel 86.

The attachment of the first bulkhead 82 to the reinforcing bracket 80 is performed such that the first bulkhead 82 is located above the rear latch mechanism support portion 102.

The attachment of the first bulkhead 82 to the reinforcing bracket 80 is performed such that the central flat part 120 of the first bulkhead 82 extends in the first direction $D_1$ and the upper side 90d of the inner door panel 70 extends in the second direction $D_2$ with the first and second directions $D_1$ and $D_2$ being angularly offset from one another by the acute angle $\alpha_1$.

The present invention includes a configuration where only the second bulkhead 84 is not employed. The second bulkhead 84 is therefore an optional component of the sliding door 14. When the second bulkhead 84 is employed, the second bulkhead 84 is attached to the reinforcing bracket 80 below the rear latch mechanism support portion 102.

Preferably, the attaching of the first bulkhead 82 to the reinforcing bracket 80 and the attaching of the second bulkhead 84 to the reinforcing bracket 80 are performed such that the central flat part 130 of the second bulkhead 84 extends in the third direction $D_3$ with the first and third directions $D_1$ and $D_3$ being angularly offset from one another by the acute angle acute angle $\alpha_2$.

Preferably, the attaching of the first bulkhead 82 is performed such that the flange sections 122a, 122b, 122c, 122d and 122g (a plurality of flange parts) are fixedly attached to the reinforcing bracket 80 with the central flat part 120 of the first bulkhead 82 extending from the flange sections 122a, 122b, 122c, 122d and 122g.

Preferably, the attaching of the second bulkhead 84 is performed such that the flange sections 132a, 132b, 132c, 132d and 132e (a plurality of flange parts) are fixedly attached to the reinforcing bracket 80 with the central flat part 130 of the second bulkhead 84 extending from the flange sections 132a, 132b, 132c, 132d and 132e.

Preferably, the attaching of the first bulkhead 82 includes attaching the flange sections 122e and 122f (flange parts of the first bulkhead 82) to the outer door panel 86. Preferably, the attaching of the second bulkhead 84 includes attaching the flange section 132f (a flange part of the second bulkhead 84) to the outer door panel 86.

Preferably, the providing the inner door panel 70 with the vertically extending reinforced section 104 is performed such that the surfaces 104a, 104b, 104c, 104d, 104e, 104f and 104g (a plurality of contoured surface sections) are formed on the outboard facing surface 88 of the inner door panel 70 such that the surfaces 104a, 104b, 104c, 104d, 104e, 104f and 104g are angularly offset from one another when viewed in cross-section.

Further, the providing of the reinforcing bracket 80 is performed such that the reinforcing bracket 80 is formed with the surface sections 80a, 80b, 80c, 80d, 80e, 80f, 80g and 80h (a plurality of contoured surface sections) that are angularly offset from one another when viewed in cross-section and are dimensioned for attachment to corresponding flange sections 122a, 122b, 122c, 122d, 122e, 122f and 122g of the first bulkhead 82 and/or to corresponding flange sections 132a, 132b, 132c and 132d of the flange 132 of the second bulkhead 84.

Preferably, the vehicle sliding door structure 12 is provided with the door opening 32 and the inner door panel 70 is dimensioned and supported for movement between the closed position (FIG. 2) covering the door opening 32 and the open position exposing the door opening 32.

Preferably, the providing of the sliding door support structure 12 is performed such that the sliding door support structure 12 includes the upper sliding mechanism 54 and the lower sliding mechanism 52. The upper sliding mechanism 54 is configured to support the upper section of the inner door panel 70 and the lower sliding mechanism 52 is configured to support a lower section of the inner door panel 70.

Preferably, the providing of the sliding door support structure 12 is performed such that the sliding door support structure 12 includes the rearward sliding mechanism 50 that is configured to support the mid-region of the rearward side of the inner door panel 70.

Preferably, the inner door panel 70 of the sliding door 14 is provided with the outer peripheral edge 90 and the vertically extending reinforced section 104. The reinforced section 104 is formed along the rear side 90c (a rearward side) of the outer peripheral edge 90. The reinforced section 104 is further provided with the rear latch mechanism support portion 102 with the latch opening 110 located proximate a mid-region of the rear side 90c.

Preferably, the outer door panel 86 is fixed to at least part of the outer peripheral edge 90 of the inner door panel 70 and the first bulkhead 82 is connected to the reinforced section 104 of the inner door panel 70. Further, areas adjacent to the latch opening 112 of the reinforcing bracket 80 are fixed to the rear latch mechanism support portion 102 of the inner door panel 70. The rear latch mechanism 60 (the first latch mechanism part) being fixed to either the inner door panel 70 or the reinforcing bracket 80, is therefore positioned and configured to engage the striker 41 (the second latch mechanism part) on the C-pillar 24 to selectively restrain the sliding door 14 against movement with the sliding door 14 in the closed position.

Second Embodiment

Referring now to FIGS. 26-29 a sliding door 214 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The sliding door 214 of the second embodiment of the present invention includes many of the features of the first embodiment, such as the inner door panel 70, the brackets 72, 74, 76, and 78 and the outer door panel 86. However, in the second embodiment, the reinforcing bracket 80 is replaced with a modified reinforcing bracket 280, the first bulkhead 82 of the first embodiment is replaced with a first bulkhead 282 and the second bulkhead 84 of the first embodiment is replaced with a second bulkhead 284.

Figure 26:
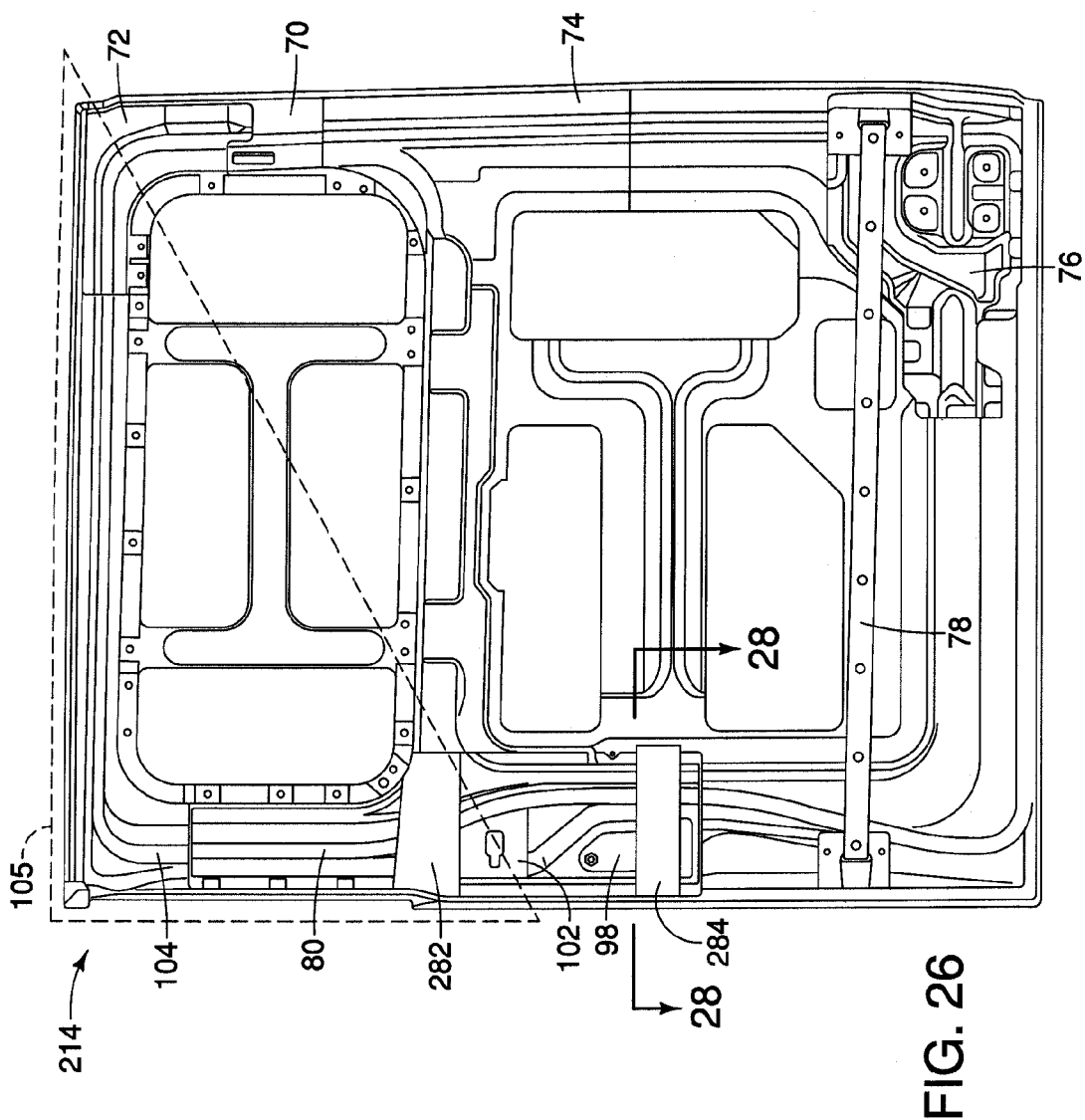
FIG. 26 a side elevational view of a sliding door, shown removed from the vehicle structure with an outer door panel of the sliding door removed to reveal the inner door panel of the sliding door, the reinforced section of the inner door panel, with the reinforcing bracket fixed to the reinforced section and first and second bulkheads fixed to the reinforcing bracket in accordance with a second embodiment of the present invention.
Figure 27:
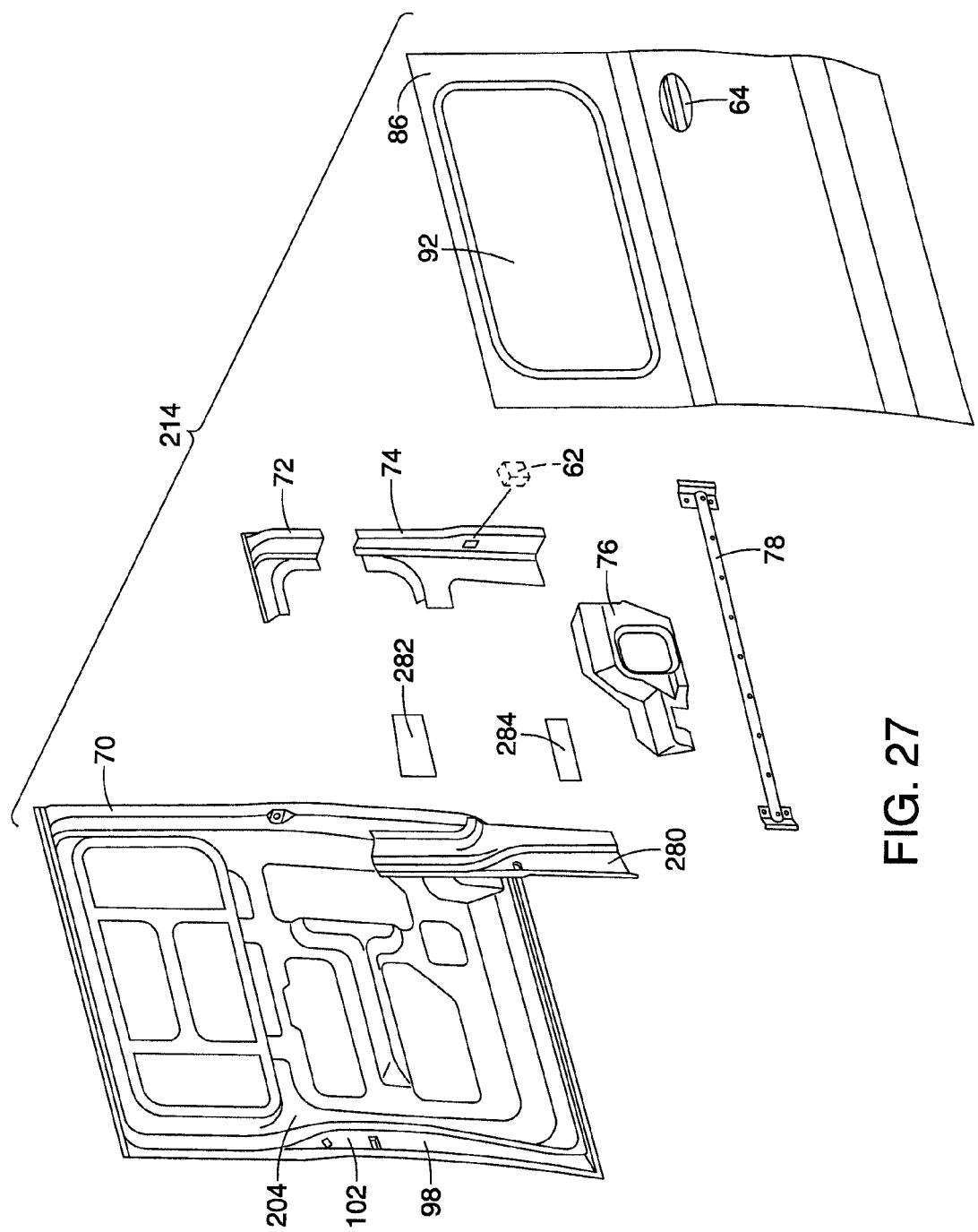
FIG. 27 is an exploded perspective view of the sliding door, shown removed from the vehicle structure showing the inner door panel of the sliding door, the reinforced section of the inner door panel, the reinforcing bracket, the first bulkhead, the second bulkhead, and the outer door panel in accordance with the second embodiment of the present invention.

In the second embodiment, the first bulkhead 282 and the second bulkhead 284 are flat bracing members preferably made of metal that extend in directions approximately parallel to one another, as shown in FIGS. 26 and 27.

Figure 28:
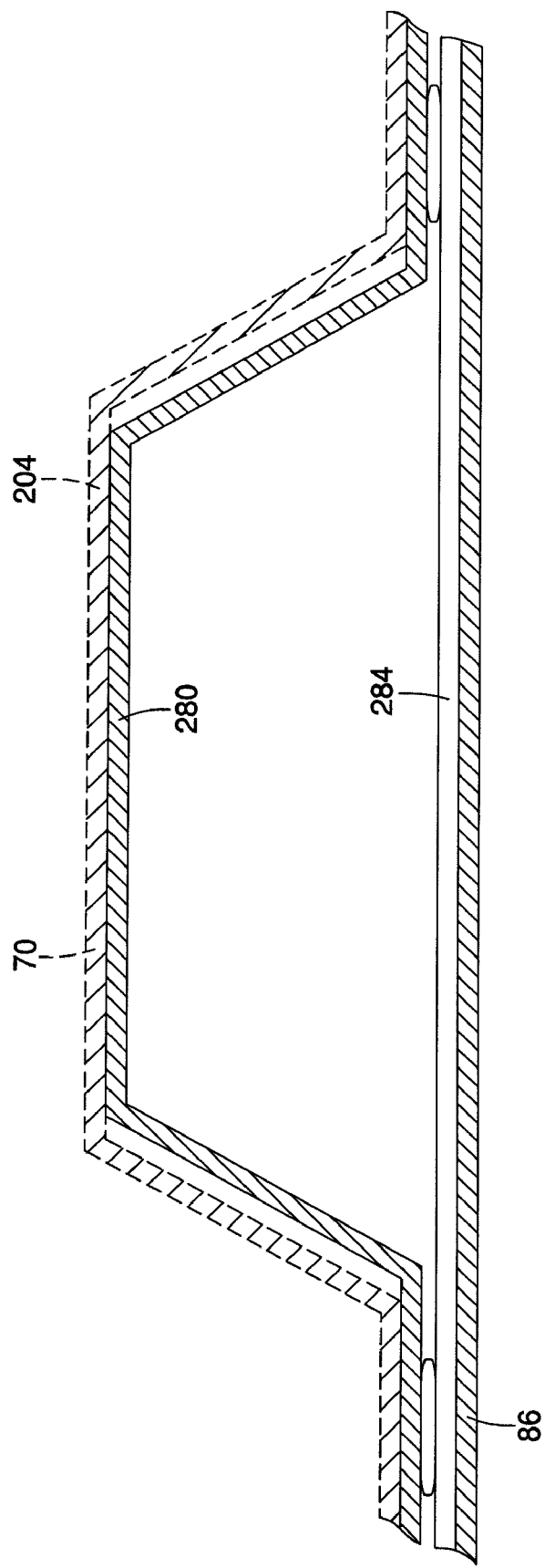
FIG. 28 is a schematic cross sectional representation of a portion the sliding door taken along the line 28-28 in FIG. 26 showing the reinforced section of the inner door panel, the reinforcing bracket, one of the bulkheads and the outer door panel of the sliding door in accordance with the second embodiment of the present invention.
Figure 29:
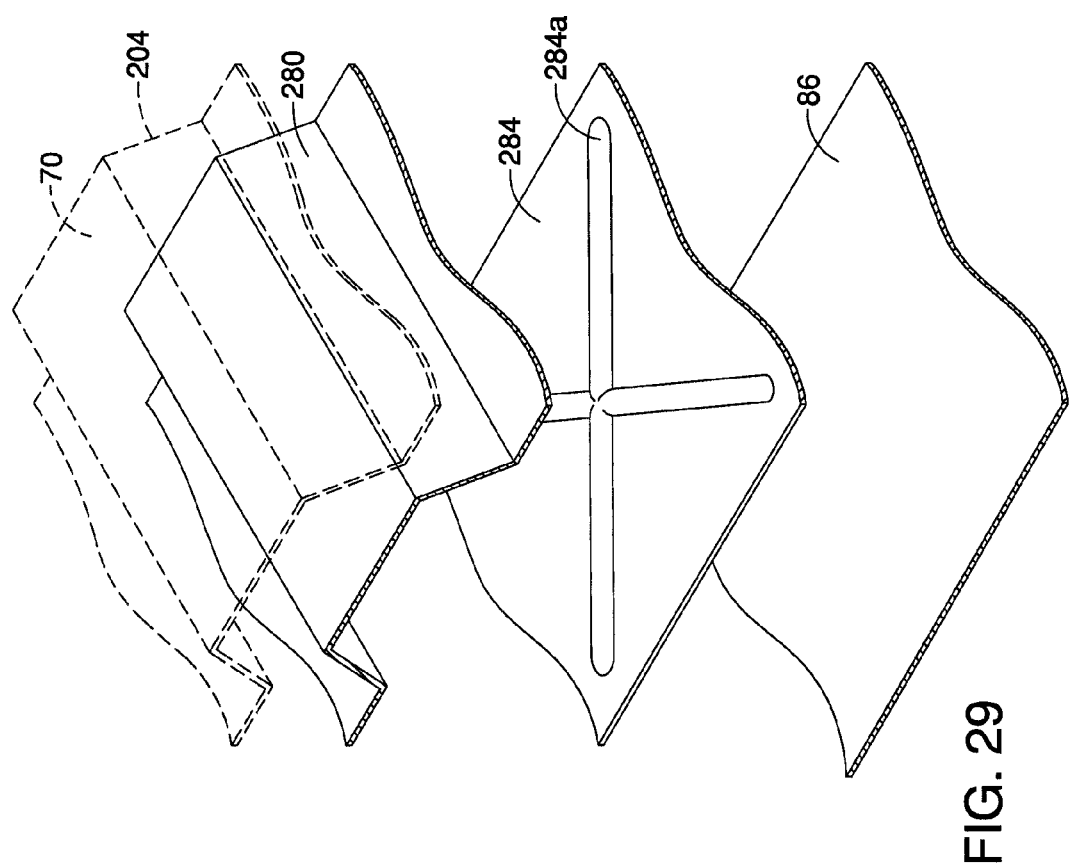
FIG. 29 is an exploded schematic perspective view of the section of the sliding door depicted in FIG. 28 showing from top to bottom: the reinforced section of the inner door panel; the reinforcing bracket; one of the bulkheads; and the outer door panel of the sliding door in accordance with the second embodiment of the present invention.

In FIGS. 28 and 29, only the second bulkhead 284 is depicted. However, the first bulkhead 282 and the second bulkhead 284 are identical. Therefore, description of one applies to both.

FIGS. 28 and 29 show a reinforced section 204 of the inner door panel 70. However this reinforced section 204 is a simplified schematic view of the reinforced section 104 of the first embodiment, showing an alternate configuration of contoured surfaces forming the reinforced section 204 when compared with the reinforced section 104 of the first embodiment. The reinforcing bracket 280 is also depicted in the second embodiment with a simplified set of contoured surfaces when compared to the reinforcing bracket 80 of the first embodiment. The reinforced section 204 of the inner door panel 70 is simplified in FIGS. 28 and 29 (and also in FIGS. 30-35) in order to more easily understand the various alternate embodiments of the present invention described below. Specifically, the reinforced section 204 and the reinforcing bracket 280 are depicted in FIGS. 28 and 29 with a minimal number of contoured surfaces, whereas the depiction of the reinforced section 104 and the reinforcing bracket 80 in FIGS. 1-25 includes an increased number of contoured surfaces. It should be understood from the description and drawings herein that the present invention is not limited to any one specific shape or configuration of contoured surfaces comprising the reinforced sections 104 and 204 and corresponding contoured surfaces of the reinforcing brackets 80 and 280. Rather, the present invention can be employed with a variety of reinforced section shapes and contours, in addition to the configurations and shapes depicted in the attached drawings.

In FIGS. 28 and 29, the second bulkhead 284 is welded to the reinforcing bracket 280 but is spaced apart from the contoured surfaces of the reinforcing bracket 280 and the contoured surfaces of the reinforced section 204. The second bulkhead 284 provides rigidity and stiffness to the reinforcing bracket 80 and the reinforced section 204 of the inner door panel 70. The second bulkhead 284 can optionally be provided with reinforcing ribs 284a, as shown in FIG. 29.

Third Embodiment

Figure 30:
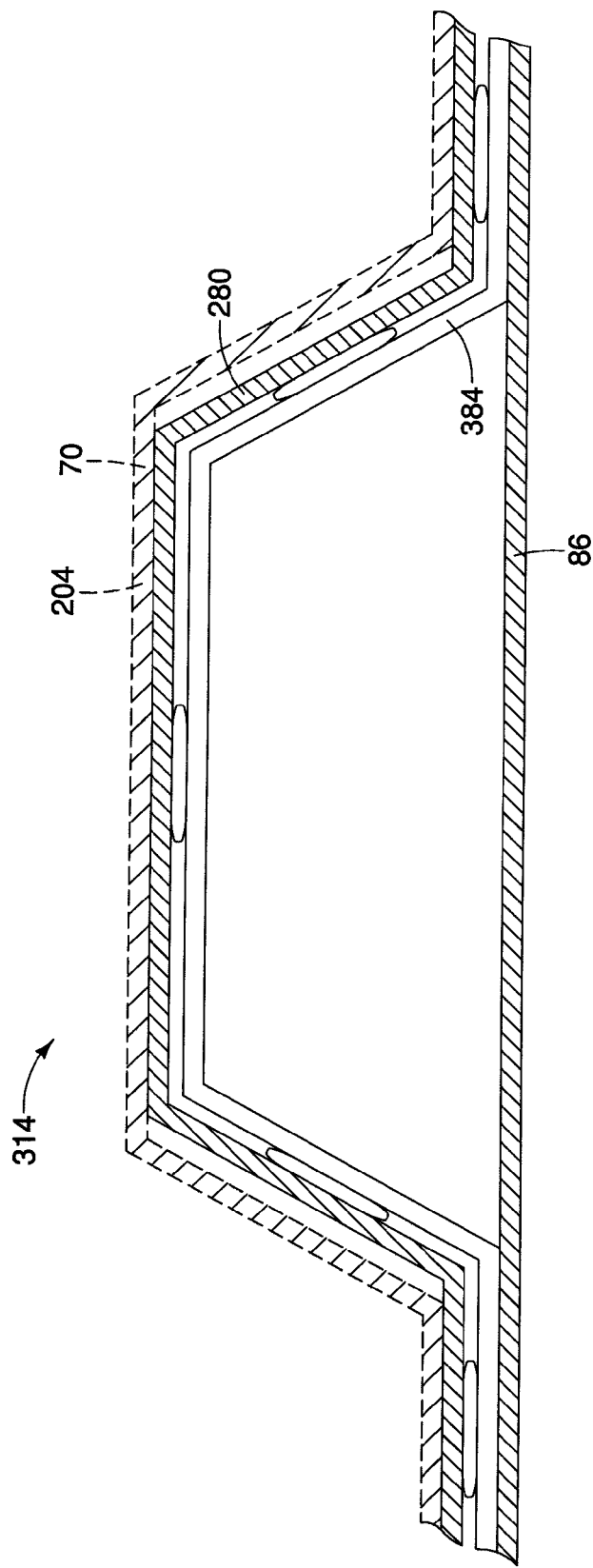
FIG. 30 is another cross section of a section the sliding door similar to FIG. 28 showing the reinforced section of the inner door panel, the reinforcing bracket, one of the bulkheads and the outer door panel of the sliding door in accordance with a third embodiment of the present invention.
Figure 31:
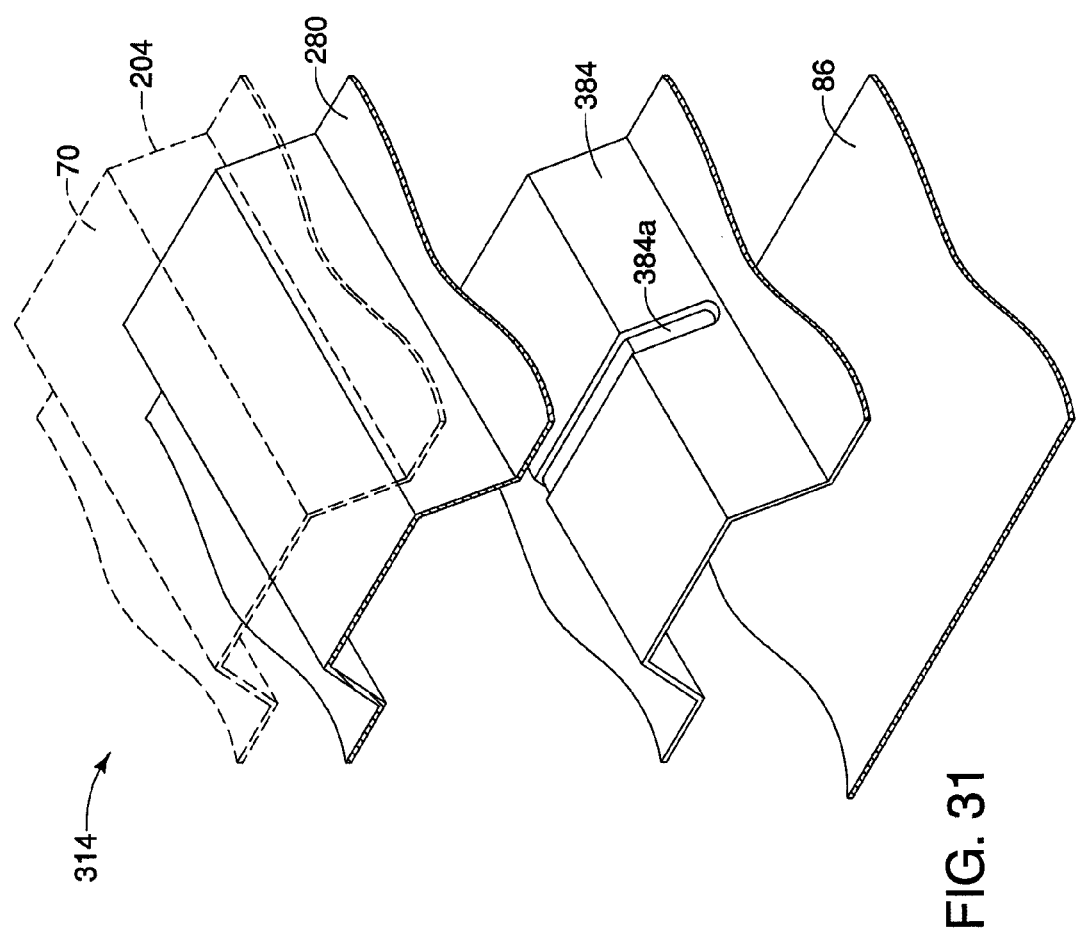
FIG. 31 is an exploded perspective view of the section of the sliding door depicted in FIG. 30 showing from top to bottom: the reinforced section of the inner door panel; the reinforcing bracket; one of the bulkheads; and the outer door panel of the sliding door in accordance with the third embodiment of the present invention.

Referring now to FIGS. 30 and 31 a sliding door 314 in accordance with a third embodiment will now be explained. In view of the similarity between the first, second and third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiments may be omitted for the sake of brevity.

The sliding door 314 of the third embodiment of the present invention includes many of the features of the first embodiment, such as the inner door panel 70 and the outer door panel 86, and the reinforcing bracket 280 of the second embodiment. However, in the third embodiment, the second bulkhead 84 of the first embodiment is replaced with a second bulkhead 384 and the first bulkhead 82 of the first embodiment is replaced with a first bulkhead that is identical to the second bulkhead 384.

In the third embodiment, the second bulkhead 384 (and first bulkhead 382) is a contoured bracing member preferably made of metal that at least partially conforms to the contoured shape of the reinforced section 204 of the inner door panel 70 and the contoured surfaces of the reinforcing bracket 280.

In FIGS. 30 and 31, only the second bulkhead 384 is depicted. However, the first bulkhead 382 and the second bulkhead 384 are identical. Therefore, description of one applies to both.

In FIGS. 30 and 31, the second bulkhead 384 is welded to the reinforcing bracket 280 and follows the contoured surfaces of the reinforcing bracket 280 and the reinforced section 204 and is further welded to at least one of the contoured surfaces of the reinforced section 204, as indicated in FIG. 30. The second bulkhead 384 provides rigidity and stiffness to the reinforcing bracket 80 and the reinforced section 204 of the inner door panel 70. The second bulkhead 384 can also be provided with reinforcing rib 384a, as shown in FIG. 31.

Fourth Embodiment

Figure 32:
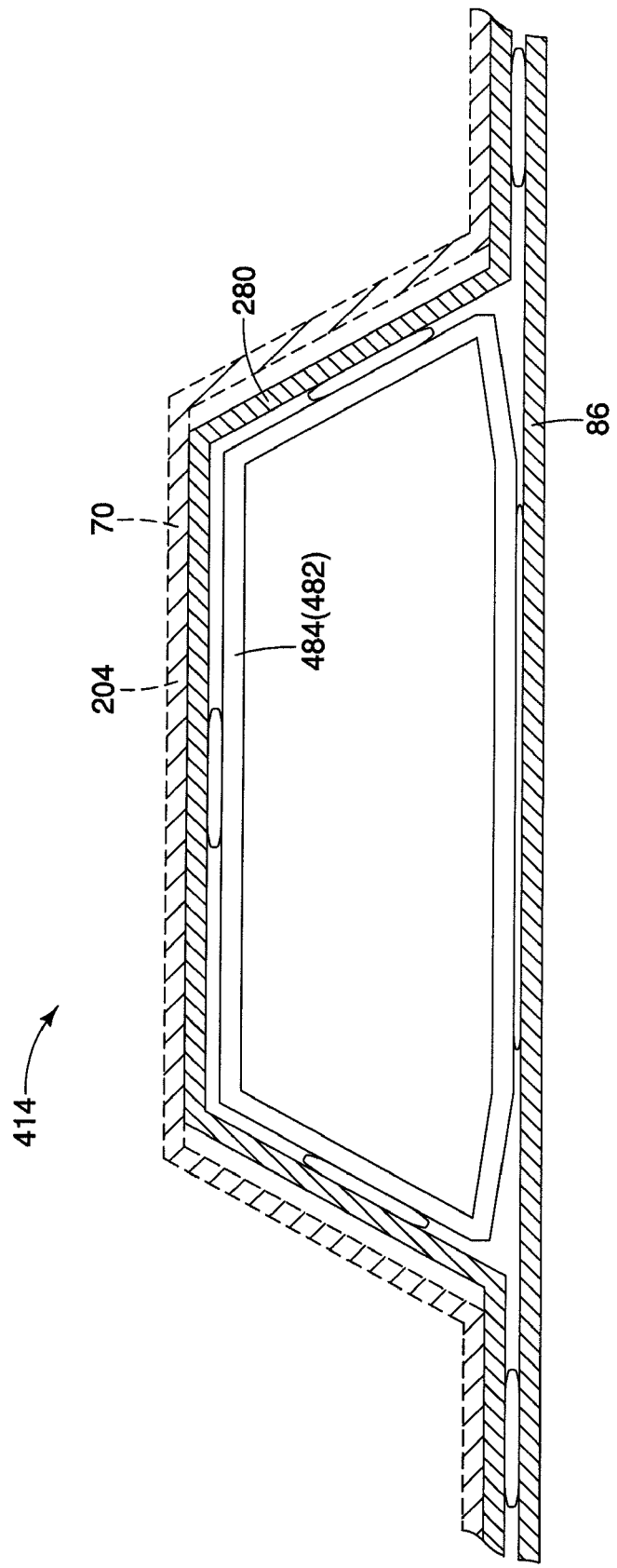
FIG. 32 is another cross section of a section the sliding door similar to FIG. 28 showing the reinforced section of the inner door panel, the reinforcing bracket, one of the bulkheads and the outer door panel of the sliding door in accordance with a fourth embodiment of the present invention.
Figure 33:
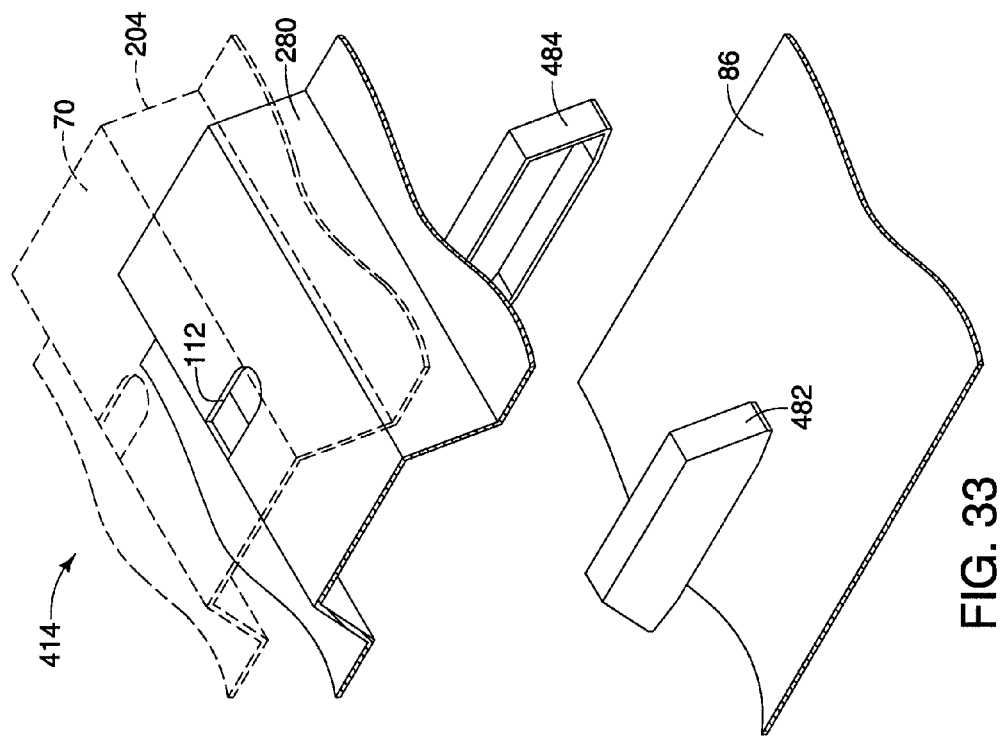
FIG. 33 is an exploded perspective view of the section of the sliding door depicted in FIG. 32 showing from top to bottom: the reinforced section of the inner door panel; the reinforcing bracket; first and second bulkheads; and the outer door panel of the sliding door in accordance with the fourth embodiment of the present invention.

Referring now to FIGS. 32 and 33 a sliding door 414 in accordance with a fourth embodiment will now be explained. In view of the similarity between the first, second and fourth embodiments, the parts of the fourth embodiment that are identical to the parts of the first and second embodiments will be given the same reference numerals as the parts of the first and second embodiments. Moreover, the descriptions of the parts of the fourth embodiment that are identical to the parts of the first and second embodiments may be omitted for the sake of brevity.

The sliding door 414 of the fourth embodiment of the present invention includes many of the features of the first embodiment, such as the inner door panel 70 and the outer door panel 86, and the reinforcing bracket 280 of the second embodiment. However, in the fourth embodiment, the first bulkhead 82 is replaced with a first bulkhead 482 and the second bulkhead 84 of the first embodiment is replaced with a second bulkhead 484.

In the fourth embodiment, the first bulkhead 482 and the second bulkhead 484 are flat metallic plate-like members with encircling flanges. The first bulkhead 482 and the second bulkhead 484 are arranged in parallel with respect to one another. The flanges of the first bulkhead 482 and the second bulkhead 484 are contoured such that the flanges at least partially conform to the contoured shape of the reinforced section 204 of the inner door panel 70 and the contoured surfaces of the reinforcing bracket 280. The flanges of the first bulkhead 482 and the second bulkhead 484 are welded to the reinforcing bracket 280. The first bulkhead 482 and the second bulkhead 484 can be attached to, adjacent to or spaced apart from the outer door panel 86.

Fifth Embodiment

Figure 34:
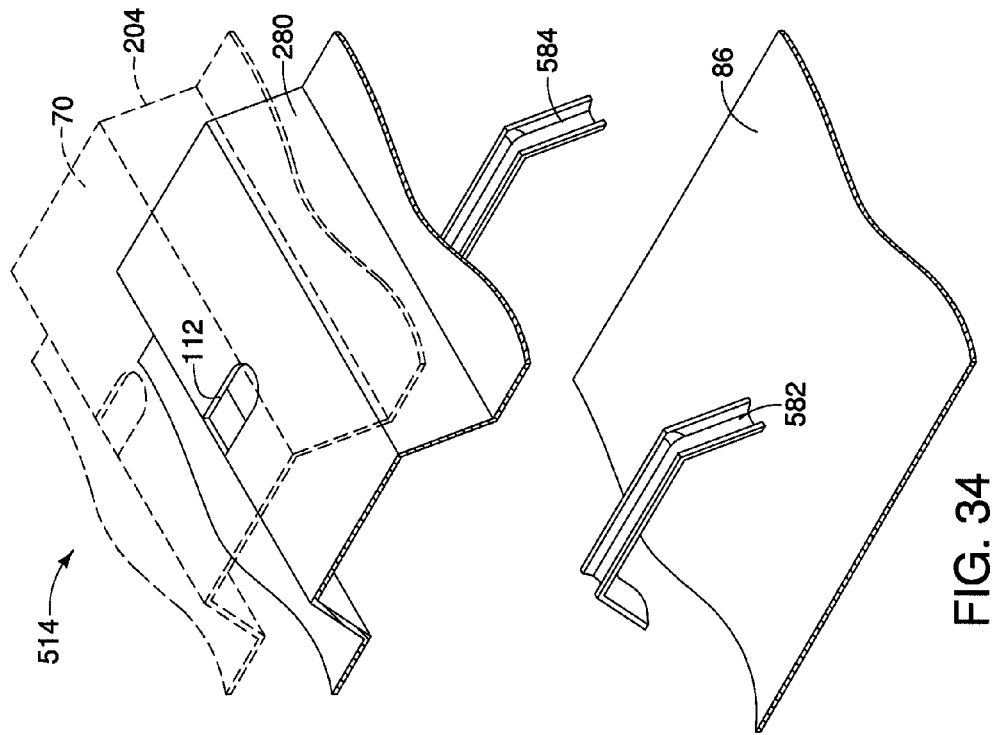
FIG. 34 is an exploded perspective view of the section of the sliding door showing from top to bottom: the reinforced section of the inner door panel; the reinforcing bracket; first and second bulkheads; and the outer door panel of the sliding door in accordance with a fifth embodiment of the present invention.

Referring now to FIG. 34 a sliding door 514 in accordance with a fifth embodiment will now be explained. In view of the similarity between the first, second and fifth embodiments, the parts of the fifth embodiment that are identical to the parts of the first and second embodiments will be given the same reference numerals as the parts of the first and second embodiments. Moreover, the descriptions of the parts of the fifth embodiment that are identical to the parts of the first and second embodiments may be omitted for the sake of brevity.

The sliding door 514 of the fifth embodiment of the present invention includes many of the features of the first embodiment, such as the inner door panel 70 and the outer door panel 86, and the reinforcing bracket 280 of the second embodiment. However, in the fifth embodiment, the first bulkhead is replaced with a first bulkhead 582 and the second bulkhead 84 of the first embodiment is replaced with a second bulkhead 584.

In the fifth embodiment, the first bulkhead 582 and the second bulkhead 584 are contoured bracing members preferably made of metal that are parallel to one another and at least partially conform to the contoured shape of the reinforced section 204 of the inner door panel 70 and the contoured surfaces of the reinforcing bracket 280. The first bulkhead 582 and the second bulkhead 584 have the appearance of a metallic tube, cut in half lengthwise, resembling an elongated channel. The first bulkhead 582 and the second bulkhead 584 are welded to the contoured surfaces of the reinforcing bracket 80. The first bulkhead 582 and the second bulkhead 584 can be attached to, adjacent to or spaced apart from the outer door panel 86.

Sixth Embodiment

Figure 35:
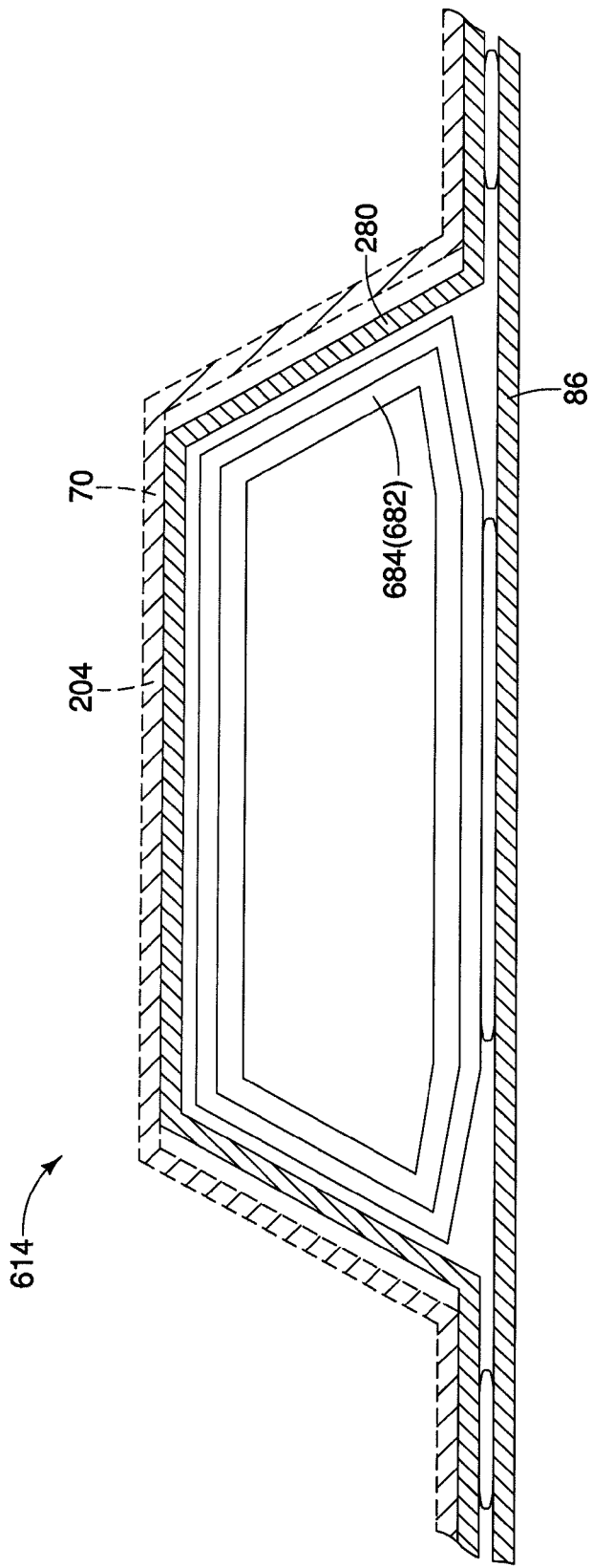
FIG. 35 is another cross section of a section the sliding door similar to FIG. 27 showing the reinforced section of the inner door panel, the reinforcing bracket, a first bulkhead and the outer door panel of the sliding door in accordance with a sixth embodiment of the present invention.
Figure 36:
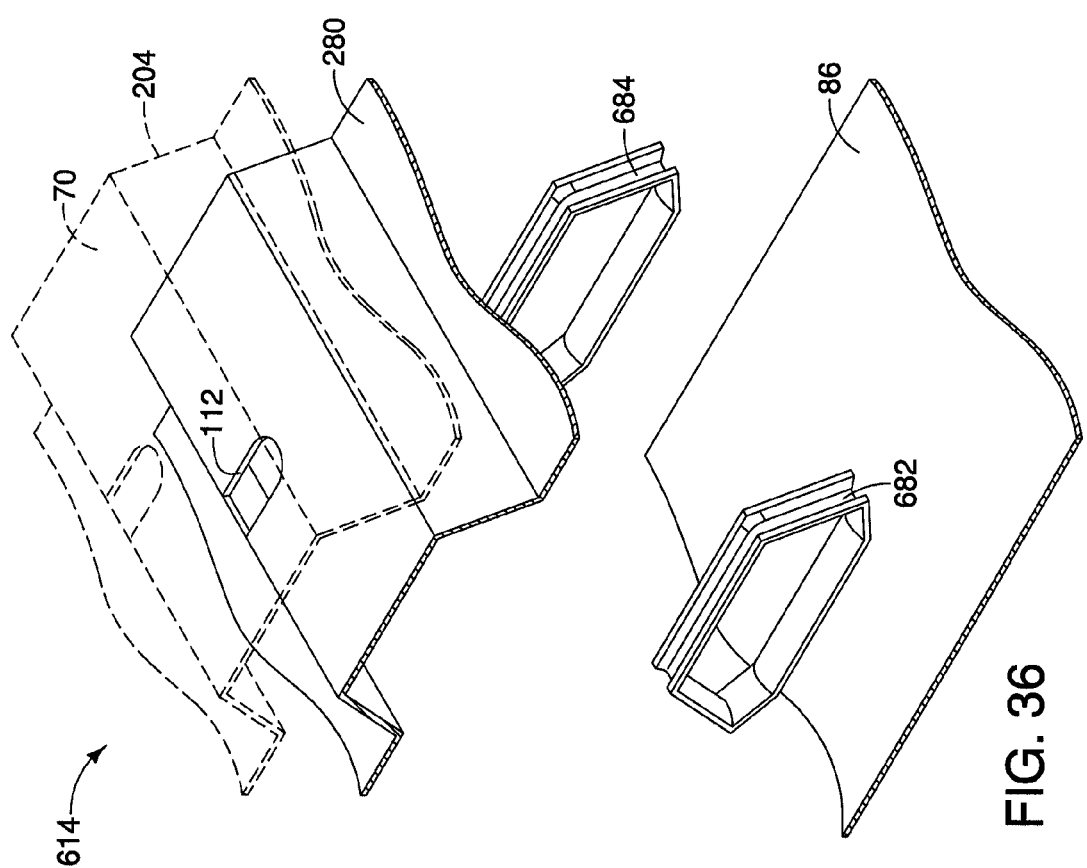
FIG. 36 is an exploded perspective view of the section of the sliding door depicted in FIG. 35 showing from top to bottom: the reinforced section of the inner door panel; the reinforcing bracket; first and second bulkheads; and the outer door panel of the sliding door in accordance with the sixth embodiment of the present invention.

Referring now to FIGS. 35 and 36 a sliding door 614 in accordance with a sixth embodiment will now be explained. In view of the similarity between the first, second and sixth embodiments, the parts of the sixth embodiment that are identical to the parts of the first and second embodiments will be given the same reference numerals as the parts of the first and second embodiments. Moreover, the descriptions of the parts of the sixth embodiment that are identical to the parts of the first and second embodiments may be omitted for the sake of brevity.

The sliding door 614 of the sixth embodiment of the present invention includes many of the features of the first embodiment, such as the inner door panel 70 and the outer door panel 86, and the reinforcing bracket 280 of the second embodiment. However, in the sixth embodiment, the first bulkhead 82 is replaced with a first bulkhead 682 and the second bulkhead 84 of the first embodiment is replaced with a second bulkhead 684.

In the sixth embodiment, the first bulkhead 682 and the second bulkhead 684 are contoured metallic ring-like members that are parallel to one another and at least partially conform to the contoured shape of the reinforced section 204 of the inner door panel 70, the contoured surfaces of the reinforcing bracket 280 and the outer door panel 86. The first bulkhead 682 and the second bulkhead 684 have a ring-like appearance with rhomboid-like shape. The first bulkhead 682 and the second bulkhead 684 are welded to the contoured surfaces of the reinforcing bracket 280 and attached to the outer door panel 86 by a mastic, an adhesive or similar attaching method.

The actual positioning of the bulkheads varies depending upon the overall design of the sliding door and the contours of the reinforced section of the door. Computer aided engineering (CAE) applied to a specific door design provides an optimization of location. In other words, the specific design, size and location of the bulkheads is not limited to the depicted embodiments above, but is determined based upon the specific design features of a specific sliding door. The first embodiment is one such CAE optimization. Changes to the design of the door may require changes in the design, shape and positioning of the bulkheads.

Seventh Embodiment

Figure 37:
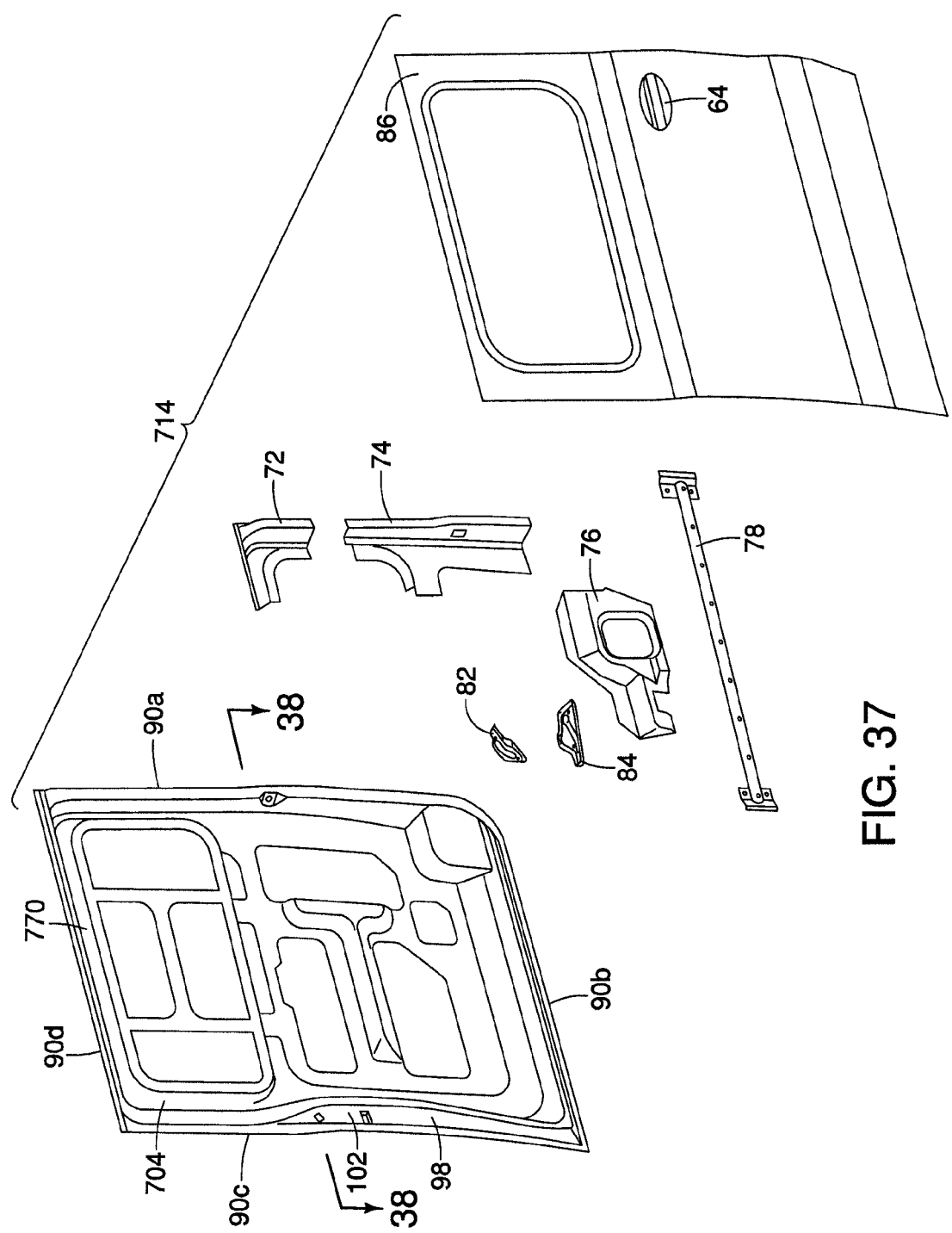
FIG. 37 is an exploded perspective view of a sliding door, shown removed from the vehicle structure showing an inner door panel of the sliding door, a reinforced section of the inner door panel, a first bulkhead, a second bulkhead, and an outer door panel in accordance with a seventh embodiment of the present invention.
Figure 38:
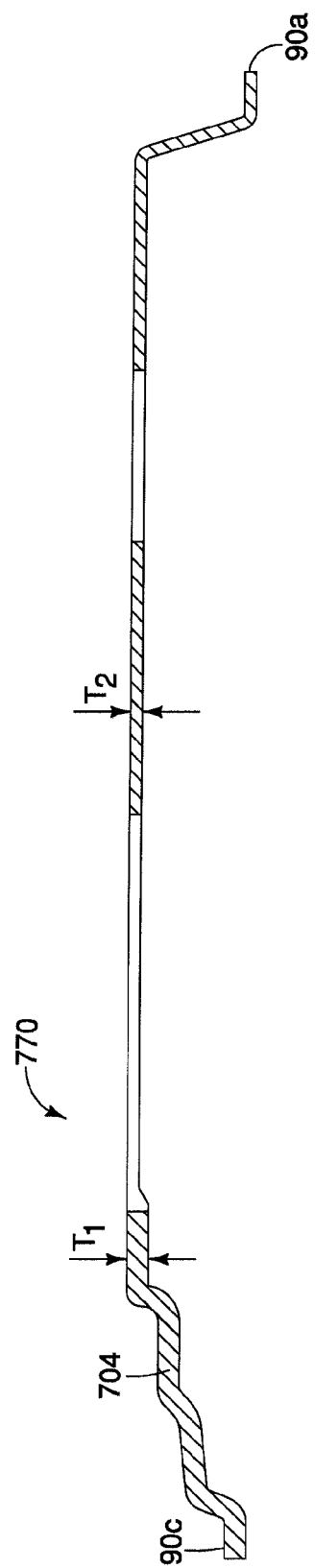
FIG. 38 is a cross-section of the inner door panel of the sliding door, showing the reinforced section of the inner door panel with a thickness that is greater than the thickness of other sections of the inner door panel of the sliding door in accordance with the seventh embodiment of the present invention.

Referring now to FIGS. 37 and 38 a sliding door 714 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

The sliding door 714 of the seventh embodiment of the present invention includes many of the features of the first embodiment, such as the brackets 72, 74, 76, and 78, first bulkhead 82, the second bulkhead 84 and the outer door panel 86. However, in the seventh embodiment, the reinforcing bracket 80 is completely eliminated. Further in the seventh embodiment, the inner door panel 70 is replaced with a modified inner door panel 770. The inner door panel 770 is identical to the inner door panel 70 of the first embodiment, except that the reinforced section 104 is modified to create a reinforced section 704. In the first embodiment, the entire inner door panel 70 preferably has an overall uniform thickness (with possible minor deviations in thickness due to manufacturing imperfection within given tolerances). However, in the seventh embodiment, the reinforced section 704 of the inner door panel 70 has a thickness $T_1$ that is preferably at least twice the thickness $T_2$ of the remainder of the inner door panel 770, as shown in FIG. 38. Preferably, the thickness $T_2$ is a conventional thickness for the inner door panel of a sliding door, and the thickness $T_1$ is approximately a doubling of that conventional thickness.

The reinforced section 704 can be provided with the thickness $T_1$ throughout the vertical length of the reinforced section 704 (i.e., from the upper side 90*d* to the lower side 90*b* along the rear side 90*c*). However, it is also possible to provide the reinforced section 704 with the thickness $T_1$ only in a region extending from above the rear latch mechanism support portion 102 to an area below the rear latch mechanism support portion 102. In other words, the thickness $T_1$ can be provided in a region of the reinforced section 704 that corresponds to the dimensions of the reinforcing bracket 80. Thus, the increase in thickness of the reinforced section 704 to the thickness $T_1$ makes it possible to eliminate the reinforcing bracket 80.

In the seventh embodiment, the first bulkhead 82 and the second bulkhead 84 are attached (welded) to the reinforced section 770. Specifically, the first bulkhead 82 is welded directly to the inner door panel 770 above the rear latch mechanism support portion 102 and the second bulkhead 84 is welded directly to the inner door panel 770 below the rear latch mechanism support portion 102. The first bulkhead 82 and the second bulkhead 84 are oriented and positioned in a manner identical to the first embodiment.

The various features of the vehicle 10 and operating mechanisms (latching and sliding mechanisms) of the sliding doors 14, 214, 314, 414, 514, 614 and 714 are conventional components that are well known in the art. Since these mechanism are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of assembling a vehicle sliding door structure, comprising:
    providing an inner door panel with an outer peripheral edge, an outboard facing surface and a vertically oriented reinforced section extending along an area of the outboard facing surface adjacent to a rearward side of the outer peripheral edge, and further providing the reinforced section with a latch mechanism supporting part that defines a latch opening located proximate a mid-region of the rearward side of the outer peripheral edge;
    providing at least one bulkhead with a central flat part and an attachment flange that extends around a peripheral edge of the central flat part;
    fixedly attaching the attachment flange of the at least one bulkhead to the outboard facing surface of the reinforced section of the inner door panel such that the central flat part extends laterally from the reinforced section toward a forward side of the outer peripheral edge; and
    attaching an outer door panel to the outer peripheral edge of the inner door panel such that the central flat part of the at least one bulkhead extends from the reinforced section of the inner door panel toward an inboard surface of the outer door panel.

2. The method according to claim 1, wherein
    the fixedly attaching of the attachment flange of the at least one bulkhead includes fixedly attaching the attachment flange to the reinforced section above the latch opening.

3. The method according to claim 2, wherein
    the fixedly attaching of the attachment flange of the at least one bulkhead includes orienting the at least one bulkhead such that the central flat part of the at least one bulkhead extends laterally angularly offset relative to an upper side of the outer peripheral edge of the inner door panel.

4. The method according to claim 1, wherein
    the fixedly attaching of the attachment flange of the at least one bulkhead comprises:
    fixedly attaching the attachment flange of a first bulkhead to the reinforced section above the latch opening; and
    fixedly attaching an attachment flange of a second bulkhead to the reinforced section below the latch opening.

5. The method according to claim 4, wherein
    the fixedly attaching of the attachment flange of the at least one bulkhead includes orienting the first bulkhead and the second bulkhead such that the central flat part of the first bulkhead extends laterally angularly offset from a central flat part of the second bulkhead.

6. The method according to claim 1, wherein
    the fixedly attaching of the attachment flange of the at least one bulkhead includes fixedly attaching a first section of the attachment flange to the reinforced section and fixedly attaching a second section of the attachment flange to an interior facing surface of the outer door panel.

7. The method according to claim 1, wherein
the providing of the inner door panel includes providing the reinforced section with a plurality of contoured surfaces, and
the providing of the at least one bulkhead includes providing the attachment flange with a first flange part and a second flange part, and
the fixedly attaching of the attachment flange of the at least one bulkhead includes fixedly attaching the first flange part and the second flange part to corresponding ones of the plurality of contoured surfaces of the reinforced section.

8. The method according to claim 7, wherein
the providing of the at least one bulkhead includes providing the attachment flange with a third flange part, and
the fixedly attaching of the attachment flange of the at least one bulkhead includes fixedly attaching the third flange part to the inner facing surface of the outer door panel.

9. The method according to claim 7, wherein
the providing of the inner door panel includes providing the plurality of contoured surfaces of the reinforced section with a first surface, a second surface angularly offset from the first surface, and a third surface angularly offset from the second surface such that the third surface faces the first surface,
the providing of the at least one bulkhead further includes providing the attachment flange with a third flange part, and
the fixedly attaching of the attachment flange of the at least one bulkhead includes fixedly attaching the first flange part to the first surface, fixedly attaching the second flange part to the second surface, and fixedly attaching the third flange part to the third surface.

10. The method according to claim 9, wherein
the providing of the inner door panel includes providing the inner door panel with a window section such that the third surface of the contoured surfaces is defined along an area of the window section, and the fixedly attaching of the attachment flange of the at least one bulkhead includes orienting the at least one bulkhead such that the central flat part of the at least one bulkhead bridges a space between the first surface and the window section.

11. The method according to claim 1, wherein
the providing of the inner door panel includes providing the inner door panel with:
an upper roller support part located at a forward upper corner of the inner door panel;
a lower roller support part located at a forward lower corner of the inner door panel;
a rear roller support part located proximate the mid-region of the rearward side of the outer peripheral edge; and
a sash section defined by a first line connecting the latch mechanism supporting part to the upper roller support part, a second line connecting the upper roller support part to a rear upper corner, and a third line connecting the rear upper corner to the latch mechanism support part.

12. The method according to claim 11, wherein
the fixedly attaching of the attachment flange of the at least one bulkhead includes orienting the at least one bulkhead such that the central flat part of the at least one bulkhead extends laterally in a direction parallel to the first line and fixedly attaching the at least one bulkhead to the reinforced section above the latch opening.

13. The method according to claim 1, wherein
the providing of the inner door panel includes providing the reinforced section with a reinforcing bracket that is fixedly attached to the outboard facing surface of the inner door panel along a region of the reinforced section that extends from below the latch mechanism supporting part to above the latch mechanism supporting part and having a second latch opening in alignment with the latch opening of the latch mechanism supporting part, and
the fixedly attaching of the attachment flange of the at least one bulkhead includes fixedly attaching the attachment flange of the at least one bulkhead to the reinforcing bracket.

14. A method of assembling a vehicle sliding door structure comprising:
providing an inner door panel with an outer peripheral edge, an outboard facing surface, and a vertically oriented reinforced section extending along an area of the outboard facing surface adjacent to a rearward side of the outer peripheral edge, the reinforced section having a latch mechanism supporting part with a first latch opening located proximate a mid-region of the rearward side of the outer peripheral edge, an upper roller support part located at a forward upper corner of the inner door panel, a lower roller support part located at a forward lower corner of the inner door panel, a rear roller support part located proximate the mid-region of the rearward side of the outer peripheral edge;
providing at least one bulkhead with a central flat part and an attachment flange that extends around a peripheral edge of the central flat part;
fixedly attaching the attachment flange of the at least one bulkhead to the outboard facing surface of the reinforced section of the inner door panel such that the central flat part extends laterally from the reinforced section toward a forward side of the outer peripheral edge; and
attaching an outer door panel to the outer peripheral edge of the inner door panel such that the central flat part of the at least one bulkhead extends from the reinforced section of the inner door panel toward an inboard surface of the outer door panel.

15. The method according to claim 14, wherein
the fixedly attaching of the attachment flange of the at least one bulkhead includes fixedly attaching the attachment flange to the reinforced section above the latch opening.

16. The method according to claim 15, wherein
the fixedly attaching of the attachment flange of the at least one bulkhead includes orienting the at least one bulkhead such that the central flat part of the at least one bulkhead extends laterally angularly offset relative to an upper side of the outer peripheral edge of the inner door panel.

17. The method according to claim 14, wherein
the fixedly attaching of the attachment flange of the at least one bulkhead comprises:
fixedly attaching the attachment flange of a first bulkhead to the reinforced section above the latch opening; and
fixedly attaching an attachment flange of a second bulkhead to the reinforced section below the latch opening.

18. The method according to claim 17, wherein
the fixedly attaching of the attachment flange of the at least one bulkhead includes orienting the first bulkhead and the second bulkhead such that the central flat part of the first bulkhead extends laterally angularly offset from a central flat part of the second bulkhead.

19. The method according to claim 14, wherein
the fixedly attaching of the attachment flange of the at least one bulkhead includes fixedly attaching a first section of the attachment flange to the reinforced section and fixedly attaching a second section of the attachment flange to an interior facing surface of the outer door panel.

20. The method according to claim 14, wherein
the providing of the inner door panel includes providing the reinforced section with a plurality of contoured surfaces, and
the providing of the at least one bulkhead includes providing the attachment flange with a first flange part and a second flange part, and
the fixedly attaching of the attachment flange of the at least one bulkhead includes fixedly attaching the first flange part and the second flange part to corresponding ones of the plurality of contoured surfaces of the reinforced section.

21. The method according to claim 20, wherein
the providing of the at least one bulkhead includes providing the attachment flange with a third flange part, and
the fixedly attaching of the attachment flange of the at least one bulkhead includes fixedly attaching the third flange part to the inner facing surface of the outer door panel.

22. The method according to claim 20, wherein
the providing of the inner door panel includes providing the plurality of contoured surfaces of the reinforced section with a first surface, a second surface angularly offset from the first surface, and a third surface angularly offset from the second surface such that the third surface faces the first surface,
the providing of the at least one bulkhead further includes providing the attachment flange with a third flange part, and
the fixedly attaching of the attachment flange of the at least one bulkhead includes fixedly attaching the first flange part to the first surface, fixedly attaching the second flange part to the second surface, and fixedly attaching the third flange part to the third surface.

23. The method according to claim 22, wherein
the providing of the inner door panel includes providing the inner door panel with a window section such that the third surface of the contoured surfaces is defined along an area of the window section, and the fixedly attaching of the attachment flange of the at least one bulkhead includes orienting the at least one bulkhead such that the central flat part of the at least one bulkhead bridges a space between the first surface and the window section.

24. The method according to claim 14, wherein
the providing of the inner door panel includes providing the inner door panel with a sash section defined by a first line that extends from the latch mechanism supporting part to the upper roller support part, a second line that extends from the upper roller support part to a rear upper corner of the inner door panel, and a third line that extends from the rear upper corner of the door panel to the latch mechanism support part, and
the fixedly attaching of the attachment flange of the at least one bulkhead includes orienting the at least one bulkhead such that the central flat part of the first bulkhead extends in a direction parallel to the first line and fixedly attaching the attachment flange of the at least one bulkhead to the reinforced section above the latch opening.

25. The method according to claim 14, wherein
the providing of the inner door panel includes providing the reinforced section with a reinforcing bracket that is fixedly attached to the outboard facing surface of the inner door panel along a region of the reinforced section that extends from below the latch mechanism supporting part to above the latch mechanism supporting part and having a second latch opening in alignment with the latch opening of the latch mechanism supporting part, and
the fixedly attaching of the attachment flange of the at least one bulkhead includes fixedly attaching the attachment flange of the at least one bulkhead to the reinforcing bracket.

* * * * *